(12) United States Patent
Doane et al.

(10) Patent No.: US 8,199,086 B2
(45) Date of Patent: Jun. 12, 2012

(54) STACKED COLOR PHOTODISPLAY

(75) Inventors: J. William Doane, Kent, OH (US); Asad A. Khan, Kent, OH (US); Erica Montbach, Kent, OH (US); Nithya Venkataraman, Wooster, OH (US)

(73) Assignee: Kent Displays Incorporated, Kent, OH (US)

( * ) Notice: Subject to any disclaimer, the term of this patent is extended or adjusted under 35 U.S.C. 154(b) by 1015 days.

(21) Appl. No.: 12/217,158

(22) Filed: Jul. 1, 2008

(65) Prior Publication Data
US 2008/0309598 A1 Dec. 18, 2008

Related U.S. Application Data

(63) Continuation-in-part of application No. 11/762,174, filed on Jun. 13, 2007, which is a continuation-in-part of application No. 11/697,514, filed on Apr. 6, 2007, now abandoned, which is a continuation-in-part of application No. 11/006,100, filed on Dec. 7, 2004, now Pat. No. 7,236,151.

(60) Provisional application No. 60/565,586, filed on Apr. 27, 2004, provisional application No. 60/539,873, filed on Jan. 28, 2004.

(51) Int. Cl.
*G09G 3/36* (2006.01)

(52) U.S. Cl. ............. 345/87; 345/1.1; 345/204; 345/88; 345/90; 349/185; 349/169; 349/176; 349/115; 428/1.1; 428/1.2; 252/583; 252/299.7

(58) Field of Classification Search .................. 345/4, 5, 345/6, 87, 204, 88, 90; 349/88–89, 115, 349/168, 169, 175, 176, 185; 348/207, 274; 428/1.1, 1.2; 252/299.5, 299.7, 583, 586, 252/588
See application file for complete search history.

(56) References Cited

U.S. PATENT DOCUMENTS
3,600,060 A 8/1971 Churchill
3,680,950 A 8/1972 Haas et al.
(Continued)

FOREIGN PATENT DOCUMENTS
WO 9209065 5/1992
(Continued)

OTHER PUBLICATIONS

J. W. Doane and A. Khan "Cholesteric Liquid Crystals for Flexible Displays" in Flexible Flat-Panel Displays, Edited by G. Crawford, Chapter 17 (John Wiley & Sons, 2005).
(Continued)

*Primary Examiner* — Lun-Yi Lao
*Assistant Examiner* — Priyank Shah
(74) *Attorney, Agent, or Firm* — Pearne & Gordon LLP

(57) ABSTRACT

The invention comprises a stacked color photodisplay apparatus using a photosensitive cholesteric liquid crystalline material on which an image can be optically addressed, retained without degradation for an indefinite period of time, electrically erased and a new image addressed. This is similar to a photographic film except that the photodisplay film can be used over and over again similar to digital display but without the cost of addressing electronics. Included is a device for enhancing the brightness of the image and electrooptical devices for optically writing digital images on the photodisplay. Each cell in the stack can be selectively addressed with a different optical image such as the red, green and blue components of a color digital image.

38 Claims, 18 Drawing Sheets

U.S. PATENT DOCUMENTS

| | | | |
|---|---|---|---|
| 4,362,903 A | | 12/1982 | Eichelberger et al. |
| 4,448,823 A | * | 5/1984 | Clifford ............ 428/1.31 |
| 4,510,188 A | | 4/1985 | Ruggeri |
| 4,566,935 A | | 1/1986 | Hornbeck |
| 4,642,250 A | | 2/1987 | Spector |
| 4,680,579 A | | 7/1987 | Ott |
| 4,684,771 A | | 8/1987 | Wuthrich |
| 4,688,900 A | | 8/1987 | Doane et al. |
| 4,747,413 A | | 5/1988 | Bloch |
| 4,890,902 A | | 1/1990 | Doane et al. |
| 4,896,946 A | | 1/1990 | Suzuki et al. |
| 4,948,232 A | | 8/1990 | Lange |
| 5,007,872 A | | 4/1991 | Tang |
| 5,061,553 A | | 10/1991 | Olsen, Jr. |
| 5,155,607 A | * | 10/1992 | Inoue et al. ............ 349/89 |
| 5,161,479 A | | 11/1992 | Mahr |
| 5,172,108 A | | 12/1992 | Wakabayashi et al. |
| 5,200,845 A | * | 4/1993 | Crooker et al. ......... 349/175 |
| 5,360,503 A | | 11/1994 | Coffy |
| 5,376,699 A | | 12/1994 | Sage |
| 5,437,811 A | * | 8/1995 | Doane et al. ........ 252/299.01 |
| 5,453,863 A | * | 9/1995 | West et al. .............. 349/35 |
| 5,493,430 A | | 2/1996 | Lu et al. |
| 5,530,457 A | | 6/1996 | Helgeson |
| 5,625,477 A | | 4/1997 | Wu et al. |
| 5,636,044 A | | 6/1997 | Yuan et al. |
| 5,644,330 A | | 7/1997 | Catchpole et al. |
| 5,668,614 A | | 9/1997 | Chien et al. |
| 5,691,795 A | | 11/1997 | Doane et al. |
| 5,734,155 A | | 3/1998 | Rostoker |
| 5,748,277 A | | 5/1998 | Huang et al. |
| 5,751,257 A | | 5/1998 | Sutherland |
| 5,815,136 A | | 9/1998 | Ikeda et al. |
| 5,847,798 A | | 12/1998 | Yang et al. |
| 5,875,012 A | * | 2/1999 | Crawford et al. .......... 349/74 |
| 5,889,572 A | | 3/1999 | Takahashi et al. |
| 5,981,408 A | | 11/1999 | Nakagawa et al. |
| 5,996,897 A | | 12/1999 | Prancz |
| 6,025,899 A | * | 2/2000 | Fukunaga et al. ......... 349/115 |
| 6,034,752 A | * | 3/2000 | Khan et al. .............. 349/74 |
| 6,061,107 A | | 5/2000 | Yang et al. |
| 6,072,619 A | | 6/2000 | Kiryuschev et al. |
| 6,096,666 A | | 8/2000 | Jachimowicz et al. |
| 6,133,895 A | | 10/2000 | Huang |
| 6,154,190 A | | 11/2000 | Yang et al. |
| 6,224,964 B1 | | 5/2001 | Kawai et al. |
| 6,253,190 B1 | | 6/2001 | Sutherland |
| 6,268,839 B1 | | 7/2001 | Yang et al. |
| 6,268,841 B1 | | 7/2001 | Cairns et al. |
| 6,269,342 B1 | | 7/2001 | Brick et al. |
| 6,270,783 B1 | | 8/2001 | Slavtcheff et al. |
| 6,271,898 B1 | | 8/2001 | Clikeman et al. |
| 6,277,439 B1 | | 8/2001 | Painter |
| 6,278,429 B1 | | 8/2001 | Ruth et al. |
| 6,307,605 B1 | | 10/2001 | Bailey |
| 6,316,278 B1 | | 11/2001 | Jacobsen et al. |
| 6,320,563 B1 | | 11/2001 | Yang et al. |
| 6,359,673 B1 | | 3/2002 | Stephenson |
| 6,377,321 B1 | * | 4/2002 | Khan et al. .............. 349/35 |
| 6,423,368 B1 | * | 7/2002 | Stephenson et al. ........... 427/64 |
| 6,433,849 B1 | | 8/2002 | Lowe |
| 6,452,590 B1 | | 9/2002 | Awamoto et al. |
| 6,459,467 B1 | | 10/2002 | Hashimoto et al. |
| 6,468,638 B2 | | 10/2002 | Jacobsen et al. |
| 6,483,563 B2 | | 11/2002 | Khan et al. |
| 6,518,944 B1 | | 2/2003 | Doane et al. |
| 6,532,052 B1 | | 3/2003 | Khan et al. |
| 6,556,262 B1 | | 4/2003 | Stephenson et al. |
| 6,585,849 B2 | | 7/2003 | Smith et al. |
| 6,602,563 B2 | * | 8/2003 | Kobayashi et al. ......... 428/1.3 |
| 6,603,259 B1 | | 8/2003 | Kiryuschev et al. |
| 6,608,438 B2 | | 8/2003 | Topelberg et al. |
| 6,618,114 B2 | | 9/2003 | Freeman |
| 6,624,565 B2 | | 9/2003 | Topelberg |
| 6,628,256 B2 | | 9/2003 | Nishimura |
| 6,639,578 B1 | | 10/2003 | Comiskey et al. |
| 6,654,080 B1 | * | 11/2003 | Khan et al. ............. 349/73 |
| 6,655,788 B1 | | 12/2003 | Freeman |
| 6,657,620 B2 | | 12/2003 | Oishi et al. |
| 6,697,039 B1 | * | 2/2004 | Yamakawa et al. ........... 345/98 |
| 6,697,191 B2 | | 2/2004 | Kiryuschev et al. |
| 6,710,760 B1 | | 3/2004 | Johnson et al. |
| 6,723,479 B2 | | 4/2004 | van de Witte et al. |
| 6,727,197 B1 | | 4/2004 | Wilson et al. |
| 6,788,362 B2 | | 9/2004 | Stephenson et al. |
| 6,811,815 B2 | | 11/2004 | He et al. |
| 6,819,310 B2 | | 11/2004 | Huang et al. |
| 6,842,210 B2 | * | 1/2005 | Hashimoto et al. .......... 349/115 |
| 6,850,217 B2 | | 2/2005 | Huang et al. |
| 6,864,435 B2 | | 3/2005 | Hermanns et al. |
| 6,893,585 B2 | | 5/2005 | Ichihashi |
| 6,902,454 B1 | | 6/2005 | Petruchik |
| 7,009,666 B2 | | 3/2006 | Khan et al. |
| 7,061,559 B2 | * | 6/2006 | Khan et al. .............. 349/73 |
| 7,088,355 B1 | * | 8/2006 | Ochi .................. 345/211 |
| 7,132,064 B2 | * | 11/2006 | Li et al. ............. 264/1.36 |
| 7,170,481 B2 | | 1/2007 | Doane et al. |
| 7,190,337 B2 | | 3/2007 | Miller, IV et al. |
| 7,236,151 B2 | | 6/2007 | Doane et al. |
| 7,385,656 B2 | * | 6/2008 | Nose et al. ............. 349/74 |
| 7,746,430 B2 | * | 6/2010 | Kurosaki et al. ........... 349/113 |
| 2001/0015712 A1 | | 8/2001 | Hashimoto |
| 2001/0040542 A1 | * | 11/2001 | Harada et al. ............. 345/87 |
| 2002/0030776 A1 | | 3/2002 | Khan et al. |
| 2002/0030786 A1 | | 3/2002 | Stephenson |
| 2002/0039167 A1 | * | 4/2002 | Kitahora et al. ........... 349/186 |
| 2002/0186182 A1 | | 12/2002 | Stephenson et al. |
| 2003/0011549 A1 | | 1/2003 | Murahashi et al. |
| 2003/0016329 A1 | | 1/2003 | Smith et al. |
| 2003/0019575 A1 | | 1/2003 | Smith et al. |
| 2003/0031845 A1 | | 2/2003 | Umeya et al. |
| 2003/0034945 A1 | * | 2/2003 | Mi et al. ............... 345/89 |
| 2003/0063245 A1 | | 4/2003 | Bowley et al. |
| 2003/0071791 A1 | | 4/2003 | Hanson et al. |
| 2003/0085380 A1 | | 5/2003 | Schuhmacher et al. |
| 2003/0117548 A1 | | 6/2003 | Stephenson |
| 2003/0128305 A1 | * | 7/2003 | Izumi et al. .............. 349/37 |
| 2003/0155151 A1 | | 8/2003 | Hermanns et al. |
| 2003/0156243 A1 | * | 8/2003 | Yoshihara et al. .......... 349/172 |
| 2003/0160912 A1 | | 8/2003 | Stephenson |
| 2003/0169221 A1 | | 9/2003 | Stephenson et al. |
| 2003/0184569 A1 | | 10/2003 | Koga et al. |
| 2003/0202136 A1 | | 10/2003 | Stephenson et al. |
| 2003/0206147 A1 | | 11/2003 | Mi et al. |
| 2003/0206260 A1 | * | 11/2003 | Kobayashi et al. .......... 349/115 |
| 2003/0222139 A1 | | 12/2003 | Stephenson et al. |
| 2004/0032545 A1 | | 2/2004 | Stephenson et al. |
| 2004/0080477 A1 | | 4/2004 | Capurso et al. |
| 2004/0145691 A1 | * | 7/2004 | Kubota et al. ........... 349/114 |
| 2005/0001797 A1 | | 1/2005 | Miller, IV et al. |
| 2005/0003144 A1 | | 1/2005 | Buttgen et al. |
| 2005/0007336 A1 | | 1/2005 | Albert et al. |
| 2005/0079386 A1 | | 4/2005 | Brown, Jr. et al. |
| 2005/0083284 A1 | | 4/2005 | Huang et al. |
| 2005/0162606 A1 | | 7/2005 | Doane et al. |
| 2005/0179678 A1 | | 8/2005 | Nose et al. |
| 2005/0195354 A1 | | 9/2005 | Doane et al. |
| 2006/0124899 A1 | | 6/2006 | Welter |
| 2006/0204675 A1 | | 9/2006 | Gao et al. |
| 2007/0059071 A1 | | 3/2007 | Majumdar et al. |
| 2007/0237906 A1 | * | 10/2007 | Li et al. .............. 428/1.2 |
| 2007/0285385 A1 | | 12/2007 | Albert et al. |

FOREIGN PATENT DOCUMENTS

| | | |
|---|---|---|
| WO | 9211311 | 7/1992 |
| WO | 2004029708 | 4/2004 |
| WO | 2005072447 | 8/2005 |
| WO | 2005072455 | 8/2005 |
| WO | 2005081779 | 9/2005 |

OTHER PUBLICATIONS

Yoshida et al., "Reflective Display with a Photoconductive Layer and Bistable Reflective Cholesteric Mixture" Journal of the SID, 5/3, 269-274 (1997).

R.D. Sterling et al., "Video-Rate Liquid Crystal Light Valve using Amorphous Silicon Photoconductor" proceedings of the SID, XXI, 327-329 (1990).
N. Hiji et al., SID Digest of Papers, vol. XXXIV, 1560-1563, (2005).
E. Sackman, J. Chem. Phys. Soc., 93, 7088-7090 (1971).
T. Ikeda, J. Mater. Chem., 13, 2037-2057 (2003).
S. Pieraccini et al., Chem. Comm., 598-599 (2003).
S. Pieraccini et al., Chem. Eur. J., 10, 5632-5639 (2004).
B.L. Feringa et al., J. Chem. Soc. Chem. Comm., 288-290, (1993).
B.L. Feringa et al., Chemical Reviews, vol. 100, pp. 1789-1816 (2000).
Li et al., J. Am. Chem. Soc., 9 vol. 129, pp. 12908-12909 (2007).
A. Bobrovsky et al., Polymers for Advanced Technologies, vol. 13, pp. 595-600 (2002).
M. Brehmer et al., Advanced Materials, 10, 1438-1441 (1998).
P. van de Witte et al., Journal of Applied Physics, 85, 7517-7521 (1999).
J.W. Doane et al., Proceedings of Japan Display '92 (Hiroshima), pp. 73-76 (1992).
Fundamentals of Liquid Crystal Devices, D-K Yang and S.T. Wu, Chapter 1 (John Wiley & Sons, New York 2006).
"Photostable tilted-perpendicular alignment of liquid crystals for light valves," Anna Lackner et al., Proceedings of the SID, vol. 31/4, 1990, pp. 321-326.
"Transparent phase images in photoactivated liquid crystals," J.S. Margerum et al., Applied Physics Letter, vol. 19, No. 7, Oct. 1, 1971, pp. 216-218.
Development of flexible electronic display using photographic technology, : Stanley Stephenson et al., SID 04 Digest, pp. 774-777.
"A fully flexible colour display," Peter Slikkerveer et al., SID 04 Digest, pp. 770-773.
"Robust flexible LCD's with paintable technology," Joost P.A. Volgels et al., SID 04 Digest, pp. 767-769.
"Invited paper: What is electronic paper? The expectations," Makoto Omodani, SID 04 Digest, pp. 128-131.
"Effect of woven fabric anisotropy on drape behavior," Sidabraite et al., ISSn 1392-1320, Materials Science, vol. 9, No. 1, 2003, pp. 111-115.
"The characterisation of the static and dynamic drape of fabrics," G.K. Stylios et al., J. Text. Inst., 1997, 88 Part 1, No. 4, pp. 465-475.
"Modelling the fused panel for a numerical stimulation of drape," Jevsnik et al., Fibers & Textiles in Eastern Europe, Jan./Mar. 2004, vol. 12, No. 1, pp. 0047-0052.
"Mechanics of elastic performance of textile materials," Chauncey Chu et al., Textile Research Journal, Aug. 1950, pp. 539-548.
"The dependence of fabric drape on bending and shear stiffness," G.E. Cusick, J. Textile Institute, 36, 11, 1965, pp. T597-T607.

"Liquid crystal dispersions," Paul S. Drzaic., World Scientific, Series on Liquid Crystals, vol. 1, pp. xi-xv, 1995.
"Plastic VGA reflective cholesteric LCDs with dynamic drive," G.M. Podojil et al., SID proceedings, 1998, pp. 51-54.
"Reflective color display using cholesteric liquid crystals," K. Hashimoto et al., SIC 98 Digest, pp. 897-900.
"Black and white photo-addressable electronic paper using encapsulated cholesteric liquid crystal and organic photoconductor," T. Kakinuma et al., IDW 2002, pp. 1345-1348.
"Characterization of "Peas in a Pod," a novel idea for electronic paper," S. Maeda et al., IDW 2002, pp. 1353-1356.
"Holographic polymer-dispersed liquid crystals (H-PDLCs)," T.J. Bunning et al., Annu. Rev. Mater. Sci. 2000, 30:83-115, pp. 83-115.
"Reflective multicolor display using cholesteric liquid crystals," M. Okada et al., Proc. SID 97 Digest, pp. 1019-1022.
"Multiple color high resolution reflective cholesteric liquid crystal display," D. Davis et al., Proc. IDRC (242) 1997.
"Full color (4096 colors) reflective cholesteric liquid crystal display," X. Huang et al., Proceedings of Asia Display, 98, pp. 883-886 (1998).
"Polymer dispersed liquid crystal displays," J. W. Doane, Liquid Crystals: Application and Uses, World Scientific Publishers (1990), Chapter 14, pp. 361-395.
"A 30-V row/column driver for PSCT LCD using high-voltage BiMOS process," Jing-Jou Tang et al., Online Article, dated 1999. http://www/us.semiconductors.phillips.com/pip/PCF8578.html, LCD/row/column driver for dot matrix graphic displays, printed Jul. 8, 2003, pp. 1-3.
"40CH segment/driver for dot matrix LCD," KS0065B, Samsung Electronics, 12 pages.
"Active matrix LC displays," F.C. Luo, Liquid Crystals: Applications and Uses, Chapter 15, pp. 397-436.
Office Action dated Mar. 8, 2006 for U.S. Appl. No. 11/046,487, filed Jan. 28, 2005, which is now Patent No. 7,170,481.
Notice of Allowance dated Aug. 28, 2006 for U.S. Appl. No. 11/046,487, filed Jan. 28, 2005, which is now Patent No. 7,170,481.
Office Action dated Mar. 8, 2006 for U.S. Appl. No. 11/006,100, filed Dec. 7, 2004, which is now Patent No. 7,236,151.
Notice of Allowance dated Dec. 28, 2006 for U.S. Appl. No. 11/006,100, filed Dec. 7, 2004, which is now Patent No. 7,236,151.
Non-Final Office Action dated Jun. 24, 2011 from related U.S. Appl. No. 11/762,174, filed Jun. 13, 2007.
Non-Final Office Action dated Dec. 9, 2010 from related U.S. Appl. No. 11/762,174, filed Jun. 13, 2007.
Non-Final Office Action dated Aug. 18, 2010 from related U.S. Appl. No. 11/762,174, filed Jun. 13, 2007.
Non-Final Office Action dated Mar. 17, 2010 from related U.S. Appl. No. 11/762,174, filed Jun. 13, 2007.

* cited by examiner

STACKED COLOR PHOTODISPLAY

CROSS-REFERENCE TO RELATED APPLICATION

This is a continuation-in-part of pending U.S. patent application Ser. No. 11/762,174 filed Jun. 13, 2007, which is a continuation-in-part of U.S. patent application Ser. No. 11/697,514 filed Apr. 6, 2007, which is a continuation-in-part of U.S. patent application Ser. No. 11/006,100 filed Dec. 7, 2004, which issued as U.S. Pat. No. 7,236,151 on Jun. 26, 2007, and claims the benefit of U.S. Provisional Patent Application No. 60/565,586 filed Apr. 27, 2004 and U.S. Provisional Patent Application No. 60/539,873 filed Jan. 28, 2004, all of which are incorporated herein by reference in their entireties.

BACKGROUND OF THE INVENTION

A revolution in the information display technology began in the early 1970s with the invention of the liquid crystal display (LCD). Because the LCD is a flat-panel display of light weight and low power which provides a visual read out that conforms to the small size, weight and battery demands of a handheld electronic device, this display technology enabled a new broad class of handheld and other portable products. Commercially, the LCD first appeared in volume as a digital readout on wrist watches, then on instruments and later, enabled the laptop computer, personal data assistant and many other digital devices. Today LCD technology is even replacing cathode ray tubes in televisions and PCs.

LCDs that appear on TVs, PCs, handheld devices, etc. are electronically addressed with an image by a multitude of direct electrical connections (interconnects) between the integrated driving circuits (drive chips) and the display electrodes that make up the pixel elements. The electrodes may be the rows and columns of a passive matrix or the data and control lines of an active matrix. The electrodes are connected by interconnects to drive chips which are further connected to and operated by controller circuitry. The drive chips and control circuitry make up a substantial cost of the display and interconnects to the drive chips must be manufactured with high yield so that there are no unaddressed pixels in the display image. It is largely because of these problems that LCDs have not been popular for such applications as point of sales signs in supermarkets, body worn displays such as badges and other applications where either the complexity of wiring up a collection of displays or the cost, weight and bulkiness of the electronics prevents their use.

Reflective bistable cholesteric displays were invented in 1991 whereby an image could be written on the display and the image retained indefinitely without any applied power [see: J. W. Doane and A. Khan "Cholesteric Liquid Crystals for Flexible Displays" in *Flexible Flat-Panel Displays*, Edited by G. Crawford, Chapter 17 (John Wiley & Sons, 2005)]. In this case, the drive electronics could be removed entirely from the display and a bright, high contrast image could be viewed at wide angles; this would be very effective for such applications as point of sales or body worn displays. However, the drive electronics would need to be reconnected to change the image thus preventing cholesteric displays from being an attractive solution for these applications.

In 1997, H. Yoshida et al. at the Liquid Crystal Institute at Kent State University offered a clever solution to this problem [see: Yoshida et al., "Reflective Display with a Photoconductive Layer and Bistable Reflective Cholesteric Mixture" *Journal of the SID*, 5/3, 269-274 (1997)]. Borrowing from earlier work on photo activated systems, they incorporated a photoconductive layer between one of the electrodes and the cholesteric liquid crystal layer to create a photoactivated reflective bistable cholesteric display [R. D. Sterling et al., "Video-Rate Liquid Crystal Light Valve using Amorphous Silicon Photo Conductor" *Proceedings of the SID*, XXI, 327-325 (1990)]. This concept enabled a display that could be addressed with a high resolution image without any drive chips or control circuitry and with only two electrical interconnects to apply a voltage to simple unpatterned electrodes. This not only eliminated bulky and costly electronics from the display but also avoided the necessity of making electrical connections to a multitude of electrodes. Recently, photoactivated bistable cholesteric displays have been further developed by Fujitsu workers [see: WO 04/029,708 A1] for contrast improvement. Workers at Fuji Xerox Ltd. also extended the photo activation concepts to flexible displays by employing organic photoconductors on the display substrate [see: N. Hiji et al., SID Digest of Papers, Vol. XXXIV, 1560-1563, (2005)]. Fuji Xerox has further developed products from these devices.

Other types of photoactivated cholesteric or chiral nematic display devices have been devised that employ photo sensitive chemical additives that adjust the reflective wavelength of the chiral nematic material in the display. In such a device the photosensitive additive shifts the reflective wavelength of exposed region of the planar texture to create an image avoiding the use of a photoconductive layer.

The idea of a chiral photochemical reaction to change the twist and hence the pitch length of a chiral nematic material goes back as far as 1971 and the studies of Sackman [E. Sackman, *J. Chem. Phys. Soc.*, 93, 7088 (1971)]. Since that time there have been some remarkable advancements in the development of novel chiral materials, [see T. Ikeda, *J. Mater. Chem.*, 13, 2037-2057 (2003)]. Of particular interest are photochemical switches that act both as a chiral agent to induce a cholesteric phase in a nematic liquid crystal and a photoresponsive dopant that can have a pronounced effect on the twist of the cholesteric helix. The photoresponsive dopants modify the periodicity of the helical twisted structure (pitch length) and consequently the Bragg reflective wavelength to act as optical switches that change the reflective color of the material. Many of the studies have involved the photo-responsive azobenzenes with chiral pendants attached to various positions; however the values of the helical twisting powers are low. Recently Pieraccini et al. [S. Pieraccini et al., *Chem. Comm.*, 598-599 (2003); S. Pieraccini et al., *Chem. Eur. J.*, 10, 5632-5639 (2004)] synthesized several bis(azo) compounds containing axially chiral binaphthyls which were found to exhibit large twisting powers. One isomer was measured to yield a twisting power of 144 $\mu m^{-1}$ and upon irradiating the material alternately at ultraviolet and visible wavelength the twisting power could be switched repeatedly between 75 $\mu m^{-1}$ and 105 $\mu m^{-1}$ Other photoswitching compounds have been examined by Feringa et al. [B. L. Feringa et al., *J. Chem. Soc. Chem. Comm.*, 288, (1993)] who studied the sterically overcrowded alkenes as chiroptical trigger molecules. Upon irradiation at the appropriate wavelength, these molecules undergo cis-trans photoisomerizations that simultaneously result in helix reversal. There is extensive literature on the chemical synthesis of reversible photochiral optical compounds that can be used as chiral optical switches (see, for example: *Chemical Reviews*, Volume 100, pp 1789-1816 (2000) by B. L. Feringa et al). Examples of such compounds are the azo derivatives as found in J. Am. Chem. Soc., 9 Vol. 129, pp. 12908-12909 (2007) by Li et al. and the diaryl compounds as found in *Polymers for Advance Technologies*, Volume 13, pp. 595-600 (2002) by A. Bobrovsky et al. The azo-compounds are both optically and thermally reversible whereas the diaryl-compounds are only optically reversible, an advantage in some applications.

More recently, T. E. Welter et al. (U.S. Patent Application Publication 2006/0124899) have disclosed photochemically active chiral compounds for use in shifting the Bragg reflective peak in the planar texture of a chiral nematic material.

Photochemical materials have been incorporated into polymers and used for making irreversible images on polymer films [see M. Brehmer et al., *Advanced Materials,* 10, 1438-1441 (1998) and P. van de Witte et al. *Journal of Applied Physics,* 85, 7517-7521 (1999)]. In this application, films are formed from the materials which can then be irradiated through a mask to create an image replicating the mask on the film. The use of polymeric materials reduces molecular diffusion allowing the image to be retained on the film for an extended period of time. U.S. Pat. No. 6,723,479 describes means for transferring optically modified films to surfaces of various items.

An application for these materials is reflective chiral nematic displays. The simplest type of display is one in which a thin layer of the photochiral doped chiral nematic material (about 5 microns thick) is sandwiched between two pieces of flat glass or transparent plastic substrates to form a display cell. In this cell the chiral nematic is made to exhibit the planar texture by any one of the methods known in the art of liquid crystal technology such as by surface treatment of the glass or plastic, by pressure or electric field. When the cell is then exposed to ultraviolet (UV) light, e.g., through a mask to create an image, the image will then appear on the cell when the mask is removed and the cell is viewed in visible light. There is a serious problem with this type of display in that the image will degrade with time either thermally (azo-compounds) or from the light used to view the image (diaryl-compounds).

Our company, Kent Displays, Inc., recently overcame this degradation problem with a new type of photodisplay that takes advantage of the bistability of the chiral nematic using both the planar and the focal conic texture to display the image; see parent U.S. patent application Ser. No. 11/762,174. In that improvement, transparent electrodes are added to the glass or plastic substrates so that an electrical field can be applied to switch the chiral nematic material between the planar and focal conic textures, both of which are stable. A permanent image that does not degrade is then created on the display by fixing the image with the focal conic texture. The image can later be electronically erased and a new image photo addressed on the display. Such displays can create extremely high resolution images. They also can be manufactured at very low cost in that they avoid all the electronics that are on a typical high resolution display such as an LCD. In this display it is usually desired to use chiral compounds that can be rapidly switched and reversed.

The present invention improves upon that of the Ser. No. 11/762,174 patent application and is an apparatus and method of making a color image, including full color images, that do not degrade in time and can be erased and readdressed with a new image. Like color photographic film, a color image is optically addressed on the display but unlike photographic film the image can be erased and the photodisplay addressed with a new color image. The photodisplay can also be in the form of a flexible film (i.e., a photo-film). We further disclose electrooptic devices for writing a digital image on the photodisplay.

DISCLOSURE OF THE INVENTION

I. General Photodisplay:

In the photoaddressed cholesteric reflective display the image is created by impinging ultraviolet or visible light or other electromagnetic radiation, which locally shifts the reflective wavelength of the cholesteric material. Materials for these cholesteric displays are made by mixing a chiral compound with nematic liquid crystal. The chiral additive twists the nematic material into a helical arrangement with a periodicity of the wavelength of light. Because of the dielectric anisotropy of the nematic liquid crystal, the result is a self-formed dielectric stack which will Bragg reflect light. According to Bragg's law, the wavelength $\lambda$, of the selective reflection is given by the equation: $\lambda = np$ where p is the pitch length of the helical structure and n is the average refractive index of the liquid crystal mixture. In mixtures of a nematic liquid crystal with one chiral additive, the reciprocal of the pitch length is approximately proportional to the concentration $\chi$, of the chiral compound, $p^{-1} = \beta\chi$ with $\beta$ being the helical twisting power (HTP). Chiral additives available today have twisting powers typically of $\beta < 5 \, \mu m^{-1}$ when $\chi$ is measured in weight percent but can vary widely to be greater than $200 \, \mu m^{-1}$ or less than $1.0 \, \mu m^{-1}$ depending upon the chiral compound and the host cholesteric material.

We make use of multiple chiral additives of twisting powers, $\beta_1, \beta_2, \beta_3, \ldots \beta_n$ whereby the inverse pitch length depends additively on these materials and their respective concentrations according to the equation: $p^{-1} = \beta_1 \xi_1 + \beta_2 \xi_2 + \ldots + \beta_n \xi_n$. At least one of the chiral additives in the invention is made of a compound in which the molecular structure is a conformer whereby the conformation of the molecule is altered with impinging light. This photochemical chiral molecule with a helical twisting power of $\beta_c$ undergoes a light induced isomerization into another conformer or isomer which has different helical twisting power. When irradiated with light or other electromagnetic radiation of a specific wavelength the chiral will switch from one isomer to the other changing the value of its twisting power. That is to say, the twisting power of the chiral compound is modulated by impinging light. One of the conformations may be metastable at a particular temperature while the other is stable or they both can be stable. In some cases there may be more than two isomers. The reversible photo responsive conformer chiral compound can be dissolved in the nematic liquid crystal host as the sole chiral additive or in addition to other chiral additives.

When a photosensitive chiral material of twisting power $\beta_c$ is added to a normal chiral material of twisting power $\beta_n$ the inverse pitch becomes $p^{-1} = \beta_n \xi_n + \beta_c \xi_c$ where $\xi_n$ and $\xi_c$ are the concentrations of the normal chiral and conformer chiral respectively. The reflective wavelength only has to change a small amount to observe a high contrast image. The magnitude of the change is calculated by the differential equation $d(p^{-1}) = d(\beta_n \xi_n + \beta_c \xi_c) = \xi c(d\beta_c)$ since the only variable in the equation is $\beta_c$. Since $d(p^{-1}) = -dp/p^2$ the change in wavelength is approximated by the equation $\Delta\lambda = n\Delta p = np^2 \xi_c(\Delta\beta_c)$ where $\Delta\beta_c$ is the change in the twisting power of the conformer chiral. The percent change $(100) \Delta\lambda/\lambda = p\xi_c(\Delta\beta_c)100 = \xi_c(\Delta\beta_c) 100/(\beta_n \xi_n + \beta_c \xi_c)$. If the photosensitive chiral compound is the only chiral additive then the percent change of the wavelength is: $100(\Delta\beta_c)/\beta_c$. By designing photosensitive chiral compounds that provide large values of $\Delta\beta_c$, one can control the sensitivity of the material to the intensity of the addressing light source.

The light-induced configuration isomerization of the compounds disclosed here is shown in Scheme 1 below. Due to the molecules having two azo linkages, ultraviolet irradiation leads to revisable trans-cis isomerization of azo configurations producing two other isomers containing one or two cis configurations, respectively (Scheme 1). The sequence of photochemical switches of the three isomers is trans-trans→trans-cis→cis-cis. The reverse process from cis-cis→trans-cis→trans-trans can occur thermally or photochemically with visible light.

Scheme 1:

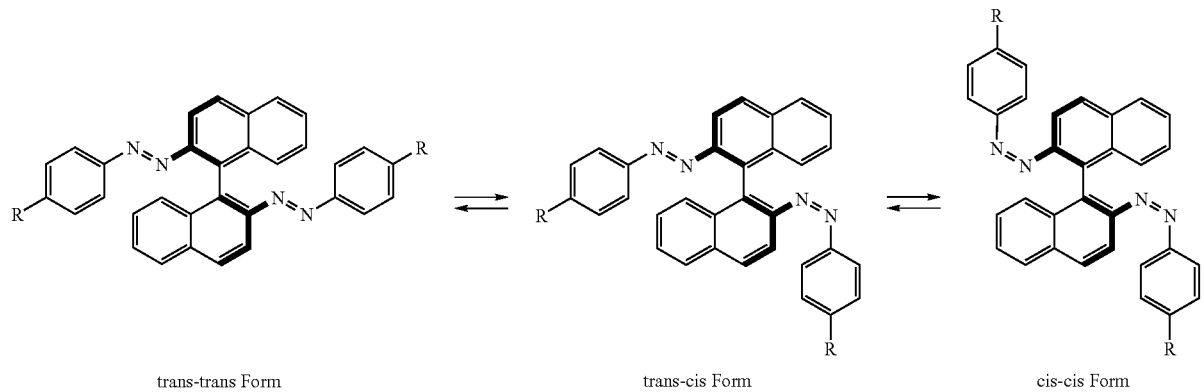

trans-trans Form        trans-cis Form        cis-cis Form

When dissolved into either a nematic liquid crystal host or a cholesteric liquid crystal host, each of the isomers exhibits a different twisting power and hence creates a helical structure with a different pitch length. In actual practice, all isomers may be present at any given time but in different concentrations depending upon the intensity, wavelength and time period of irradiation as well as the temperature of the material and the time following the irradiation. In this case, the photosensitive chiral compound exhibits an average twisting power depending upon the relative concentration of the isomers. The reflective wavelength of the chiral material is therefore changed by incident electromagnetic radiation on the material.

The chiral nematic material can be coated or otherwise disposed on a substrate with black or colored background to achieve high contrast. For example, if the concentrations of the chiral additives are adjusted so that the pitch length of the material reflects in the yellow, then a display cell with the chiral nematic with black background will show a brilliant yellow color when in its planar texture. If, however, the background of the display cell is blue, the display cell will appear white since the blue color of the background will additively mix with the yellow reflective color to produce white. By selecting a chiral conformer that shifts the wavelength of the chiral additives to some other color, say blue, then the cell with the black background will show a blue color at locations that are irradiated and yellow where not irradiated displaying an image in the planar texture we refer to as a planar image. When irradiated through a mask of a selected image, that image will appear as a blue planar image on yellow background on the display. In the case of the display cell with a blue background, irradiation through the mask will show a blue planar image on a white background. If, on the other hand the pitch of the base material is in the infrared and the background is black, the display will show a color planar image on black with the color depending upon the pitch of the chiral in its other photo induced conformation. Such a display is limited because the planar image will self erase over a period of time as a result of two effects: self diffusion of the chiral additive and thermal relaxation.

Thermal relaxation can erase the planar image over a period of hours or less because the various photoinduced isomers may be thermally unstable relaxing to the preferred trans-trans configuration as illustrated in scheme 1 above.

Self-diffusion of the photoaddressed chiral additive will degrade a planar image of this embodiment of a photo addressed display unless the chiral additive is confined so that it cannot diffuse far. This problem is solved by using droplet dispersions of the chiral nematic materials in which the material is encapsulated in droplets approximately 50-100 μm in size, for example, small enough for an extremely high resolution display suitable for photographs. There are various processes for preparing droplet dispersions, for example, microencapsulation, emulsions and phase separation. Thin display films are fabricated by coating a droplet dispersion on a substrate [U.S. patent application Ser. Nos. 11/046,487 and 11/006,100 and PCT patent application No.: PCT/US2005/003144, which are incorporated herein by reference].

The photocell display device can incorporate transparent conducting electrodes above and below the photo chiral doped chiral nematic material. The photo display design is similar to a normal bistable electronically switched display; however, the electrodes do not have to be patterned and electronic drive and controller circuitry is not present. The purpose of the electrodes in this case is to electrically switch the cholesteric material into the planar or focal conic or homeotropic texture as desired. Being able to change textures provides several added advantages:

The image may be maintained indefinitely without thermal degradation;

A photo-addressed image may be viewed in ambient light without degradation;

The image will not be erased by self diffusion and encapsulation is not required;

The image may be erased and rewritten; and

An image may be hidden from view then be made to later reappear.

In many respects the photodisplay is similar to a photographic camera but with a major difference; the photo image may be erased from the film and a new image addressed. The photodisplay works on the unique voltage thresholds of a bistable chiral nematic display. The threshold values depend on the pitch length of the chiral nematic material. When a region of the display is exposed to ultraviolet light the threshold will change while the threshold of the unexposed region is unchanged. Reference herein to optically addressing and unaddressed regions of the photodisplay are synonymous with exposing and unexposed regions of the photodisplay, respectively; there terms are used interchangeably throughout this disclosure. By applying a voltage pulse of suitable magnitude to the electrodes the exposed region will be switched to the transparent focal conic texture. On a photodisplay cell with a black absorbing back layer the focal conic state will appear black in contrast to the unexposed color reflective planar texture. In a bistable chiral nematic display both the focal conic and the planar texture are stable so that the image will not degrade with time but is fixed until electronically erased and is referred to as a fixed image to distinguish it from the planar image that will degrade with time. A photoaddressed fixed image can be viewed in ambient light indefinitely until erased and a new fixed image addressed. A fixed image can be erased with voltage of higher magnitude by clearing the display cell to the all-planar texture after the planar image has been thermally erased. The photodisplay device can be of two types depending upon the reversibly photoswitchable chiral dopant and the chiral mixtures. One type will display a fixed positive image and the other a fixed negative image. Depending upon the photochiral materials used an ultraviolet filter covering the display cell may be used under some viewing conditions to avoid background ultraviolet light from shifting the reflective wavelength or color or image. Generally, however, a filter is not necessary.

Other advantages in this photodisplay design became apparent. For example, one can hide an image that is in the planar from being viewed on the display by switching the entire display to the focal conic texture. The photodisplay can therefore act as a memory device even when the image cannot be seen. The homeotropic state also can be used to hide the image. In this case continual power need be applied to hold the chiral nematic material in the untwisted homeotropic state.

There is a need in today's marketplace for a very low-cost display (on the order of pennies) that can display a high resolution image without applied power. The photodisplay is updated with an image writing device that can be an emissive display such as an LED, OLED or backlit LCD. The updating device projects an image to photo address the display. The image may be formed from a digital image. Photo addressed displays that can use optical updating include name tags and badges, electronic shelf labels, debit or credit cards as well as informational signs. Shelf labels could include a bar code scanner to read a bar code and automatically update a display if the price has been changed once the updating device reads the bar code and determines that a price change is warranted. As cost is an overriding factor in these applications, the display must be exceedingly simple, contain few parts and be manufacturable in high volume. This optical addressed display requires no electrode patterning, no drive and no control circuitry and is simple. This device can be manufactured on simple web coating or print equipment. With optical addressing, extremely high resolution images are possible.

II. Stacked Photodisplay for Multicolor Images and Manner of Optically Writing on it:

The present invention builds upon and incorporates the prior Basic Photodisplay invention of U.S. patent application Ser. No. 11/762,174 discussed above in the Disclosure of the Invention, in Detailed Description sections and Examples, which disclose a photodisplay device incorporating transparent conducting electrodes and a bistable cholesteric liquid crystal that can be electrically switched between the planar and focal conic textures. The basic photodisplay is optically addressed with light (e.g., ultraviolet light) by exposure of an image onto the planar texture. The image is then fixed by applying a voltage to the electrodes so that it can be retained indefinitely on the display even though the reversible photochiral material may relax to its previous state as induced by thermal agitation or optical exposure. This is made possible because regions of the cholesteric display that are exposed to the light are shifted to a different pitch length and consequently different response voltage such that an applied voltage can selectively switch either the exposed or unexposed regions created by the image to the focal conic state. Since the cholesteric material is bistable the image therefore remains indefinitely on the display until erased and a new image addressed. The image can be erased after the photochiral material has been optically switched or thermally relaxed to its original state. After erasure, a new image can be addressed to the device.

More specifically, the present invention is a stacked color photodisplay device and means of optical addressing it is based upon reversible photochiral optical additives to cholesteric materials in which the Bragg reflective color can be reversibly switched. The reversibility of the photochiral material enables stacked bistable cholesteric display cells of different reflective colors to be sequentially optically addressed to form a separate and different image on each cell. Additive color mixing of the reflected light from the stacked assembly then produces a color image. Gray scale imaging on each cell can be used to provide a full color image.

The instant invention makes use of a stacked assembly of photodisplay cells of different reflective colors. A preferred embodiment is a triple stack of the primary colors red, green and blue reflective cells. When the red, green and blue portions of a digital image are optically addressed on the respective cells, the colors additively mix to provide a multiple color image. A full-color image is possible when levels of gray are addressed on each photocell. The device makes use of a reversible photochiral material so that an image can be optically addressed on each cell and each cell selectively erased. A preferred photochiral material is one in which the twisting power is switched to one value when exposed with UV light and returned to its original twisting power when exposed with visible light.

In the preferred embodiment, a multiple color image is written by executing the following sequence of events on a triple stack in which each cell in the stack appears blue, green, and red, respectively, when viewed in ambient light and in which each of the display cells (also referred to as "displays" or "liquid crystal layers" in this disclosure) contains a photochiral of suitable concentration that can be optically switched and reversed.

1. A voltage pulse is applied to the electrodes of all of the cells to drive them to the planar texture.
2. The display stack is irradiated with a UV image of the blue portion of the digital signal and a voltage pulse applied to the electrodes of the blue display to fix the image.
3. The display stack is then irradiated with light to erase the all-planar images from all the displays to their original color. Note that the fixed blue image remains on the blue display because it is stabilized by the focal conic texture.
4. The display stack is irradiated with a UV image of the green portion of the digital signal and a voltage pulse applied to the green display to fix the image.
5. The display stack is then irradiated with light to erase the all-planar images from all the displays to their original color. Note that the fixed blue and green images remain on the displays because they are stabilized by the focal conic texture.
6. The display stack is irradiated with a UV image of the red portion of the digital signal and a voltage pulse applied to the red display to fix the image.

7. The display stack is then irradiated with light to erase the all-planar images from all the displays to their original color. Note that the fixed red, green and blue images remain on the display in visible light because they are stabilized by the focal conic texture, thereby providing an RGB multicolor image.

The image can be erased by applying a voltage pulse to drive all of the displays to the planar texture. It is also to be understood that the order of addressing the cells is unimportant. The image can be a full color image when levels of gray of each digital color are optically exposed on the display. Levels of gray can be achieved as is known on the art such as by spatial dithering as is known in the art of liquid crystal displays. Stacked cells with left and right chirality of the same color or different color to improve brightness as well as other embodiments such as photodisplays for black on white are also disclosed.

An optical image writer that can produce optical images from a digital signal can be achieved using an electronic display such as a backlit LCD, light emissive LED (OLED) or deformable mirror light projection engine.

A utility of the instant invention is to produce a low cost photodisplay that can display extremely high resolution color images for such uses as security and ID badges, stored value cards, credit cards, smart cards and the like. The photodisplay may be in the form of a plastic film of similar thickness and flexibility as a photographic film. The cost of the high resolution photodisplay film is substantially less than an electronic display since it is void of the costly drive and control electronics and patterned substrates.

SUMMARY OF THE INVENTION

More specifically, a first embodiment of the invention features a stacked photodisplay comprising at least first and second layers of cholesteric liquid crystal material stacked in a fixed relation to each other including a first and a second photosensitive chiral additive, respectively; electrically conductive layers flanking each of said first and second liquid crystal layers; a light absorbing layer positioned to absorb light passing through said first and second layers; wherein said first liquid crystal layer includes a first fixed image portion and said second liquid crystal layer includes a second fixed image portion that is different than said first fixed image portion, said first and second fixed image portions including a focal conic texture that is stable in an absence of an electric field and a planar texture, wherein said first and second fixed image portions combine to form an image on said photodisplay. In a further embodiment, the first and second layers may be disposed in a fixed relation over a substrate which may be flexible and comprised of a transparent polymer or transparent flexible glass. In a further embodiment, there may be a plurality of substrates which my form the outer surface of the photodisplay and/or may be present between adjacent liquid crystal layers.

A further embodiment of the invention, in addition to the features identified in the preceding paragraph, includes a third layer of cholesteric liquid crystal material stacked in a fixed relation to said first and second liquid crystal layers, and including a third photosensitive chiral additive; electrically conductive layers flanking said third liquid crystal layer; said light absorbing layer absorbing light passing through said first, second and third liquid crystal layers; wherein said third liquid crystal layer includes a third fixed image portion that is different than said first and second fixed image portions, wherein said first, second and third fixed image portions combine to form an image on said photodisplay. In a further embodiment, the first, second and third layers may be disposed in a fixed relation over a substrate which may be flexible and comprised of a transparent polymer or transparent flexible glass.

Another aspect of the invention includes the liquid crystals of the invention comprising a dispersion of the liquid crystal material in a polymeric matrix.

A further aspect of the invention includes the photodisplay described above wherein said first cholesteric liquid crystal material has a pitch length effective to reflect light of a first color in ambient light and said second cholesteric liquid crystal material has a pitch length effective to reflect light of a second color in ambient light that is different than said first color. Another aspect of the photodisplay includes the photodisplay as describe above wherein the third cholesteric liquid crystal material has a pitch length effective to reflect light of a third color in ambient light, wherein said first, second and third colors are different from each other. In a further aspect of the invention, the first, second and third colors may be red, green and blue in any order.

An additional aspect of the invention includes articles comprising the photodisplay of the invention including, but not limited to, point of sales signs, debit cards, stored value cards, smart cards, credit cards, name plates, name tags, security badges, identification badges, informational signs, electronic shelf labels and combinations thereof.

A further aspect of the invention relates to an apparatus for writing on a photodisplay, the photodisplay including two or three layers of cholesteric liquid crystal material stacked relative to each other each including a photosensitive chiral additive, electrically conductive layers flanking each of said liquid crystal layers and a light absorbing layer positioned to absorb light passing through said liquid crystal layers, said apparatus comprising:

a controller adapted to provide electronic image data signals corresponding to image data and to provide electronic light source signals;

an electronic display device, such as, but not limited to, a backlit liquid crystal display, including a plurality of pixels adapted to form images when said pixels are in ON or OFF states;

a display driver adapted to supply voltage pulses to said display device in response to said image data signals from said controller effective to independently place said pixels of said display device in said ON or OFF states;

a light source adapted to be energized or de-energized in response to said light source signals from said controller effective to project ultraviolet light through said display device onto said photodisplay;

wherein when said light source is energized to produce ultraviolet light and said display driver applies said voltage pulses forming the image on said display device the ultraviolet light passing through the image of said display device addresses said photodisplay with an image portion formed of optically addressed regions at a first twisting power and optically unaddressed regions at a second twisting power; and a pulse driver adapted to apply fixing voltage pulses to said electrically conductive layers flanking a selected one of said liquid crystal layers effective to form a fixed image portion by placing one of said optically addressed or optically unaddressed regions of said selected layer in a focal conic texture that is stable in an absence of an electric field and the other of said optically addressed or optically unaddressed regions of said selected layer in a planar texture, said pulse driver being further adapted to apply erasing pulses that erase said fixed images from said photodisplay, wherein said light source can be energized to apply visible light to said photodisplay effective to erase all images from said photodisplay except for said fixed image portions.

A further aspect of the invention includes the apparatus as described hereinbefore and further includes a computer for processing said electronic image data used by said controller.

Another aspect of the invention includes a method of optically writing on a stacked color photodisplay comprising the steps of:

a) providing a photodisplay including two or three layers of cholesteric liquid crystal material stacked on each other, said liquid crystal layers each comprising nematic liquid crystal and a photosensitive chiral additive that is adapted to be reversibly changed between a first twisting power and a second twisting power, said liquid crystal material of said liquid crystal layers having a pitch length effective to reflect light of different predetermined colors in ambient light, electrically conductive layers flanking each of said liquid crystal layers, and a light absorbing layer that absorbs light passing through said liquid crystal layers;

b) projecting electromagnetic radiation to address said photodisplay with an image portion formed of optically addressed regions where said photosensitive additives are at said first twisting power and optically unaddressed regions where said photosensitive additives are at said second twisting power;

c) applying fixing voltage pulses to said electrically conductive layers flanking a selected one of said liquid crystal layers effective to form a fixed image portion by placing one of said optically addressed or optically unaddressed regions of said selected layer in a focal conic texture that is stable in an absence of an electric field and the other of said optically addressed or optically unaddressed regions of said selected layer in a planar texture;

d) erasing all images from said photodisplay except for said fixed image portions; and e) repeating steps c) and d) until said photodisplay reflects a fixed image comprising an additive mixture of two or three different said fixed image portions each being at said predetermined colors.

An additional aspect of the invention involves the method as described hereinbefore and further comprises applying erasing voltage pulses to the conductive layers effective to place all of said liquid crystal layers in an all planar texture.

Another aspect of the invention relates to the method as described above wherein step d) is carried out by applying visible light or heat to said photodisplay without said image mask.

Many additional aspects, features, advantages and a fuller understanding of the invention will be had from the accompanying drawings and the detailed description that follows. It should be understood that the above Disclosure of the Invention includes a description of the invention in broad terms while the following Detailed Description includes a description of the invention more narrowly and presents specific embodiments that should not be construed as necessary limitations of the invention as broadly defined in the claims.

DETAILED DESCRIPTION OF THE INVENTION

I. General Photodisplay

Figure 1:
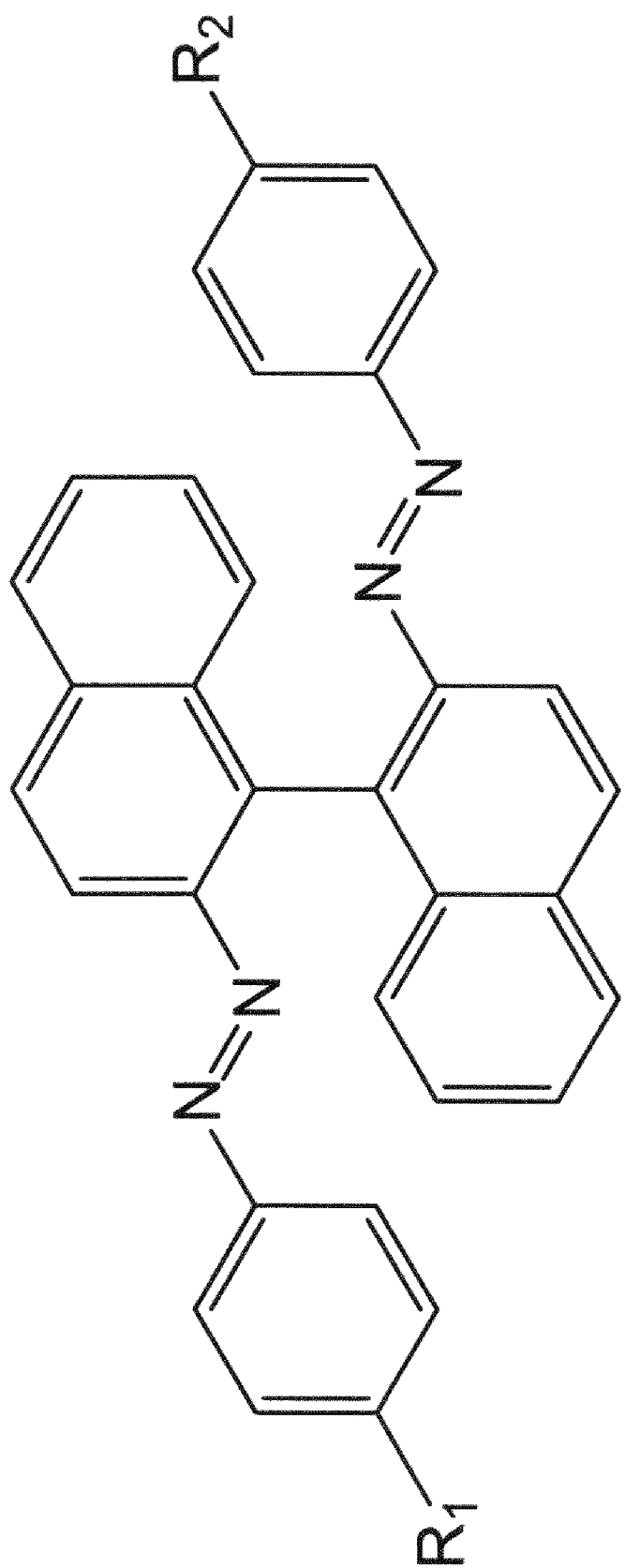
FIG. 1: Molecular structure of one present embodiment reversible photo responsive chiral compounds.

Disclosed are reversible photo responsive compounds and chiral nematic photo display devices whereby the chiral nematic material contains any photo responsive chiral additive that can be photoswitched between at least two different moieties each with different helical twisting powers. FIG. 1 shows the disclosed structure of the present exemplary embodiment reversible photo responsive chiral compounds where axially chiral binaphthyl group is (S) form or (R) form, and $R_1$ and $R_2$ may be any same or different which may contain one or more chiral centers. In the disclosed structure of the reversible photo responsive chiral compounds, axially chiral binaphthyl group may be (S) form or (R) form, and $R_1$ and $R_2$ may be the same or different any group, one of the two groups may contain one or more chiral centers. $R_1$ and $R_2$ may independently be a straight chain or branched chain alkyl group (C1-30) which may contain: any chiral center, halogen, $NO_2$, CN, O, S, C=C, C≡C, aromatic group, polyaromatic group, heterocyclic group, and/or cycloalkyl group.

Figure 2:
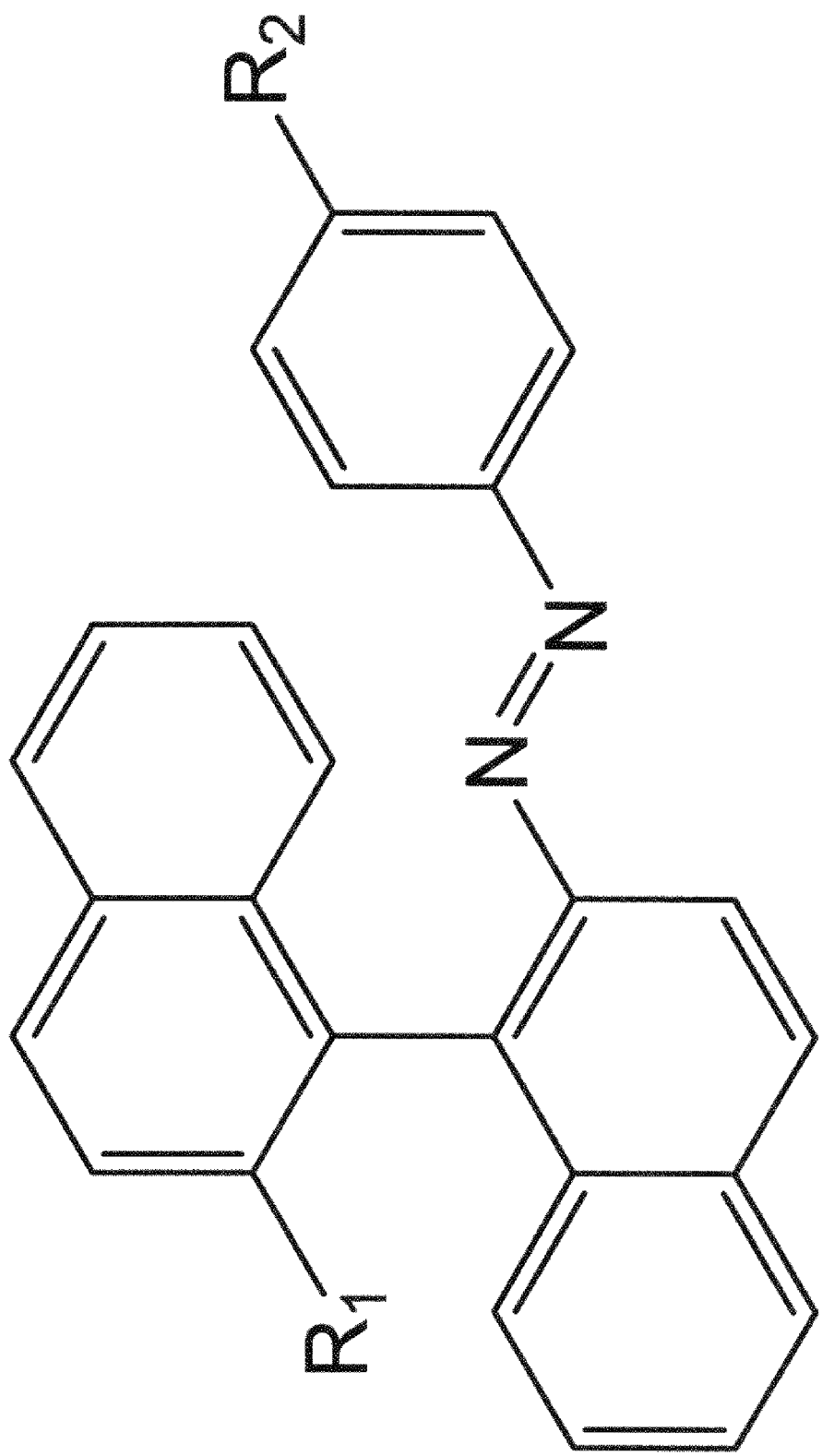
FIG. 2: Molecular structure of other present embodiment reversible photo responsive chiral compounds.

FIG. 2 shows the disclosed structure of the other present embodiment reversible photo responsive chiral compounds where axially chiral binaphthyl group is (S) form or (R) form, and $R_1$ and $R_2$ may be any same or different group which may contain one or more chiral centers. In the disclosed structure of the reversible photo responsive chiral compounds, axially chiral binaphthyl group is (S) form or (R) form, and $R_1$ and $R_2$ may be the same or different any group, one of the two groups must contain one or more chiral centers. $R_1$ and $R_2$ may independently be a straight chain or branched chain alkyl group (C1-30) which may contain: any chiral center, halogen, $NO_2$, CN, O, S, C=C, C≡C, aromatic group, polyaromatic group, heterocyclic group, and/or cycloalkyl group.

When one or more compounds in FIG. 1 or/and FIG. 2 are dissolved in either a nematic liquid crystal or a chiral nematic liquid crystal they form a photochiral nematic liquid crystal in which the pitch length of the chiral is changed upon exposure to ultraviolet light. This has the effect of changing the electrooptic properties of the photo responsive chiral nematic material. Compounds in FIG. 1 and FIG. 2 can exhibit high helical twisting powers in which case only small concentrations of the photo materials are often needed in order to twist the photochiral material to a pitch length sufficient to Bragg reflect light in the visible range showing brilliant colors in the planar texture of the chiral nematic phase. When dissolved in sufficient quantity, the photo responsive chiral materials can change the color of the reflected light by a perceptible amount.

Figure 3:
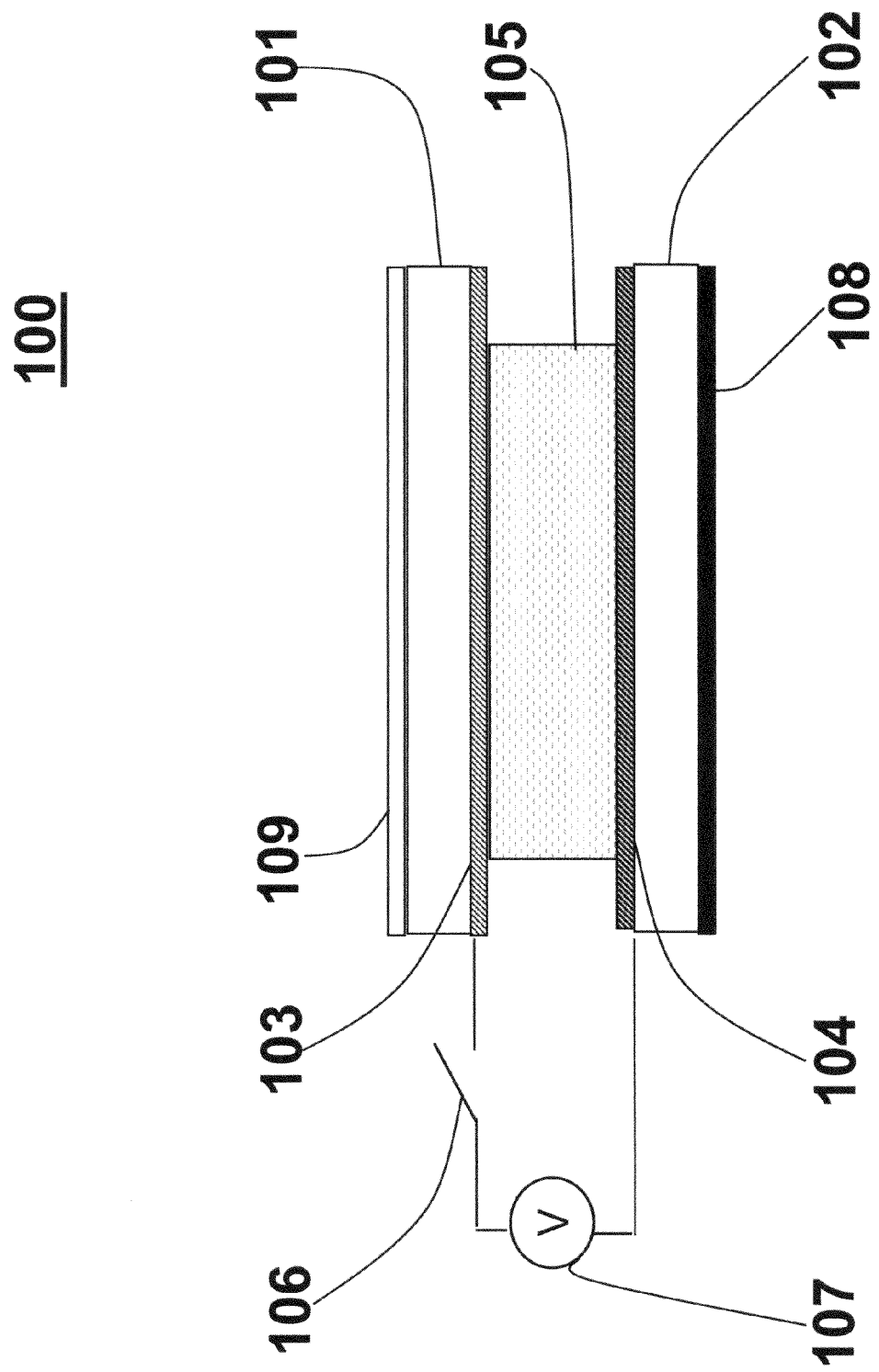
FIG. 3: Schematic side view of the photodisplay cell.

Referring to FIG. 3, the schematic of the side view of a photoaddressed display cell 100 is shown which consists of substrates 101 and 102. The upper substrate 101 must be transparent to ultraviolet and visible light while the lower substrate 102 may be transparent or an opaque absorber of light. It is not desired that the surface of 102 be reflective. Substrates 101 and 102 may be of glass or polymeric materials as is common on prior art liquid crystal display technology.

Conducting electrodes 103 and 104 are formed on the surface of the substrates 101 and 102 respectively. The first conducting electrode 103 must be transparent to UV and visible light. Preferred electrode materials for 103 and 104 are indium-tin-oxide (ITO), or a conducting polymer as is well known in the art of liquid crystal displays. It is not important that the lower conducting electrode 104 be transparent but can absorb light in the visible spectrum. It is not desired that the electrode 104 be reflective.

A light absorbing layer 108 is coated or laminated on a bottom of the display. A preferred color for this layer is black but can be any other color as may be selected to provided contrast or color to the display image as is known in the art of bistable chiral nematic displays as can be found for example in U.S. Pat. No. 5,493,430.

The electrooptic responsive layer 105 consists of a mixture of nematic liquid crystalline material and chiral molecular additives, at least one of which is a photochiral additive. The nematic material may itself be a mixture of many different liquid crystalline materials as is well known the art of liquid crystalline displays in order to achieve the desired performance. Desired nematic materials include commercial materials with high dielectric anisotropy and high birefringence such as from Merck products E7 or E44. The voltage applied to the electrodes depends upon the dielectric anisotropy. Therefore, nematic material that has a high dielectric anisotropy is selected when low voltages are desired. Furthermore, to achieve high reflective brightness of the viewed image the nematic liquid crystal should possess high birefringence. These are the same nematic material characteristics used in the art of bistable chiral nematic displays. At least one of the chiral additives to the nematic liquid crystal must by a photochiral additive that can change its helical twisting power upon being irradiated by ultraviolet, visible or infrared light. Preferred photo responsive chiral materials are compounds that exhibit a helical twisting power of at least 10 $\mu m^{-1}$ (weight fraction); however, a higher twisting power of about 50 $\mu m^{-1}$ or larger is generally desired. In the presence of ultraviolet or visible light the photo responsive chiral compound should exhibit a substantially different helical twisting power separated from the unexposed value by at least 10%. Again, it is desired that the difference between the exposed and the unexposed values be as large as possible, even perhaps changing the handedness of the helical twist. The photo responsive chiral additive may be mixed with other chiral compounds that are not necessarily photo responsive chirals. This mixing may be used to achieve a particular temperature dependence, to achieve addressing light sensitivity or to achieve a particular type of image such as a positive or negative image. The chiral material may exhibit a thermally stable HTP upon irradiation with UV light or it may relax to its original HTP over a period of time due to thermal agitation on visible light exposure. As will be described later, the former property is the desired property for the invention described in order to be able to electronically erase and optically rewrite a new image.

Depending upon the ambient lighting conditions that are used to view an image on the display as well as upon the photochiral materials used, it may be necessary to have a UV light filter 109 covering surface of substrate 101. The purpose of the filter is to prevent the image from changing color or otherwise being degraded altogether because of background ultraviolet light in the ambient viewing source from shifting the HTP of the material. A desired filter 109 can be either a long pass filter with a particular cut-off wavelength or a band pass filter that eliminates a segment of the UV and visible spectrum thereby fixing the color of the image. If the photochiral materials are adjusted for the ambient lighting conditions then a filter is generally not necessary.

Figure 4:
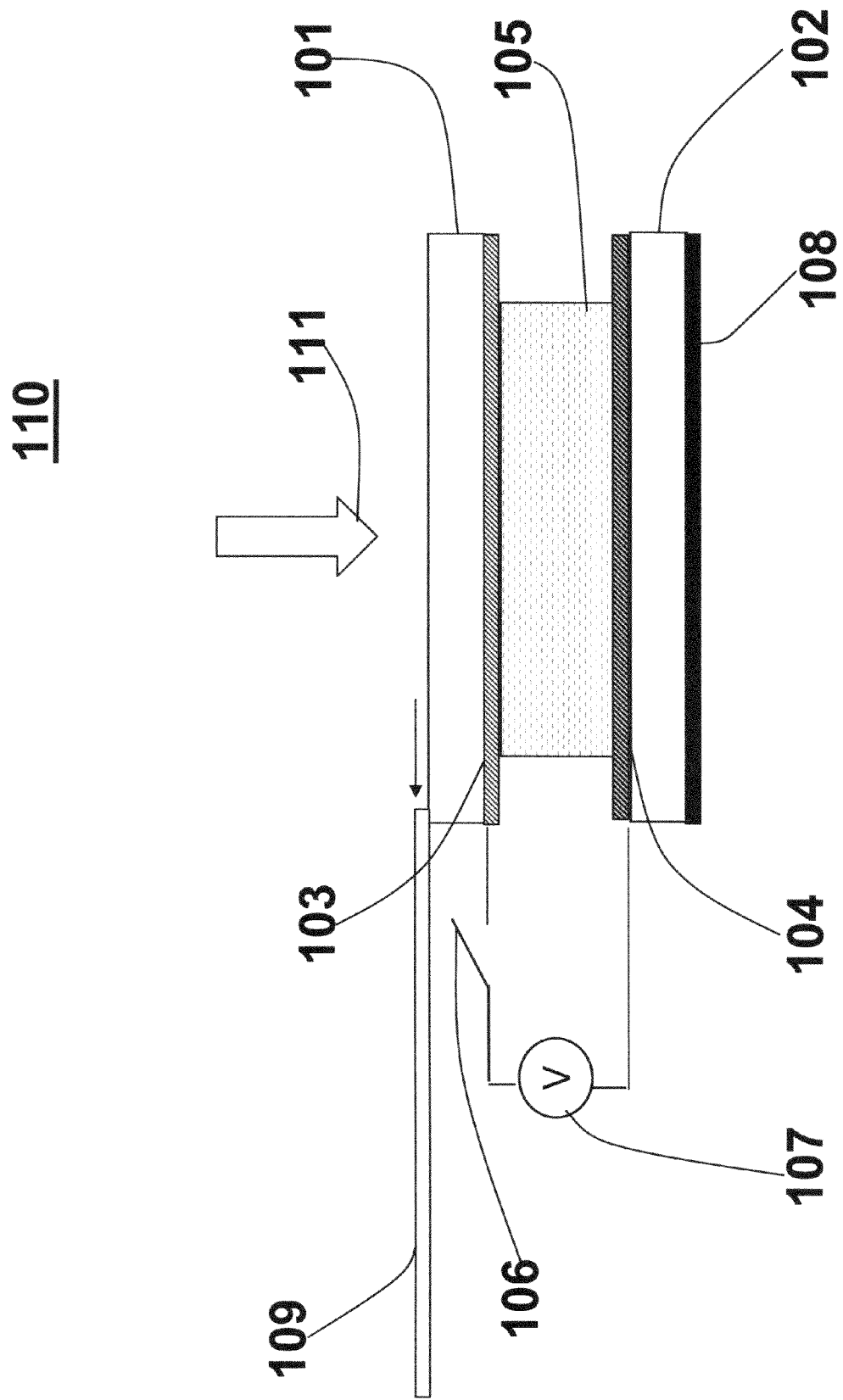
FIG. 4: Schematic side view of one present embodiment of the photodisplay cell optically addressed from the viewing side.

An image on photodisplay 100 is addressed onto the planar texture (planar image) of the chiral nematic material 105 by a writing light as indicated in one embodiment illustrated in FIG. 4 where the filter 109 is removed and the writing light (optical addressing device) directed as indicated by the arrow 111. The planar image may be created by shining UV light through a mask placed over the display cell or it may be created by a writing device such as an emissive display or light scanner. A simple writing device can be a backlit LCD, LED, OLED or fluorescent display with an emissive spectrum sufficient to excite the photochiral materials and change its HTP value. A digital high resolution image on the writing device is used to expose the planar texture of the photodisplay by placing it adjacent to the substrate 101 by lifting off or sliding the filter 109 if present. After exposure, filter 109 is returned to its original position as in the display 100 of FIG. 3 in order to prevent the viewing ambient visible light from degrading the image. Once the image is exposed to the planar texture, the planar image will thermally erase unless the exposed region is further switched to the focal conic state by use of an applied voltage, V, 107, applied by closing the switch 106. This image will be fixed and not thermally degrade. The value of the voltage required for this action is described later in the discussion of FIGS. 6 and 7.

It is desired that the switch 106 be an electronic switch applied through circuitry and that the applied voltage be in the form of a voltage pulse to drive the exposed material to the focal conic texture creating the fixed image, described later with regard to FIGS. 6 and 7. The switch 106 may also be used to drive all the material (exposed and unexposed) back into the planar texture. This can be used a means to electronically erase the fixed image.

Figure 5:
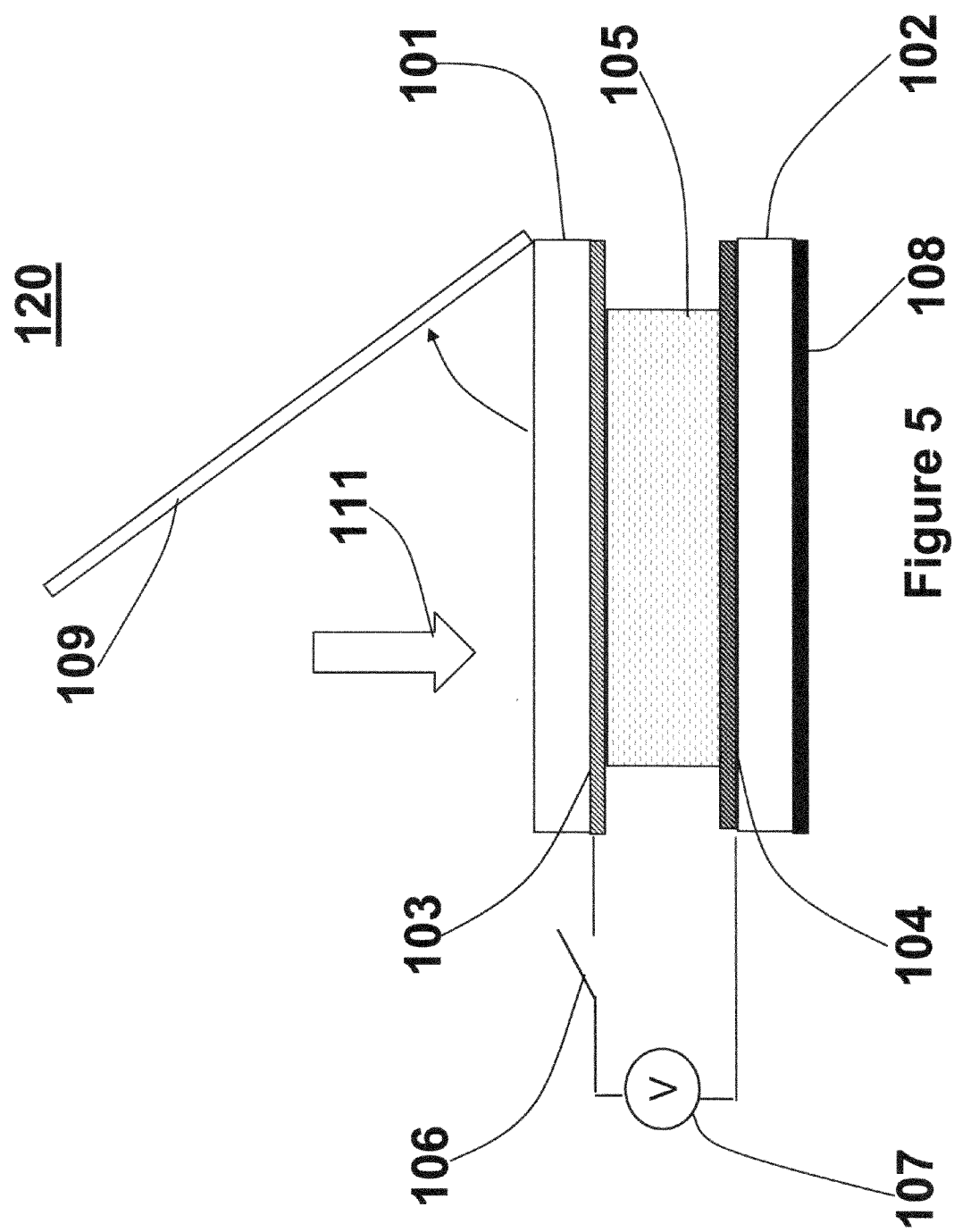
FIG. 5: Schematic side view of another present embodiment of the photodisplay cell optically addressed from the viewing side.

FIG. 5 is another embodiment of a photodisplay 120 where the filter 109 (if needed) is hinged on one side to be lifted, thereby allowing the photodisplay to be imaged from the viewing side as indicated by the arrow 111. Once regions of the liquid crystal material have been exposed, filter 109 is closed to shield the display from UV light and prevent the viewing visible light from degrading the image.

Figure 6:
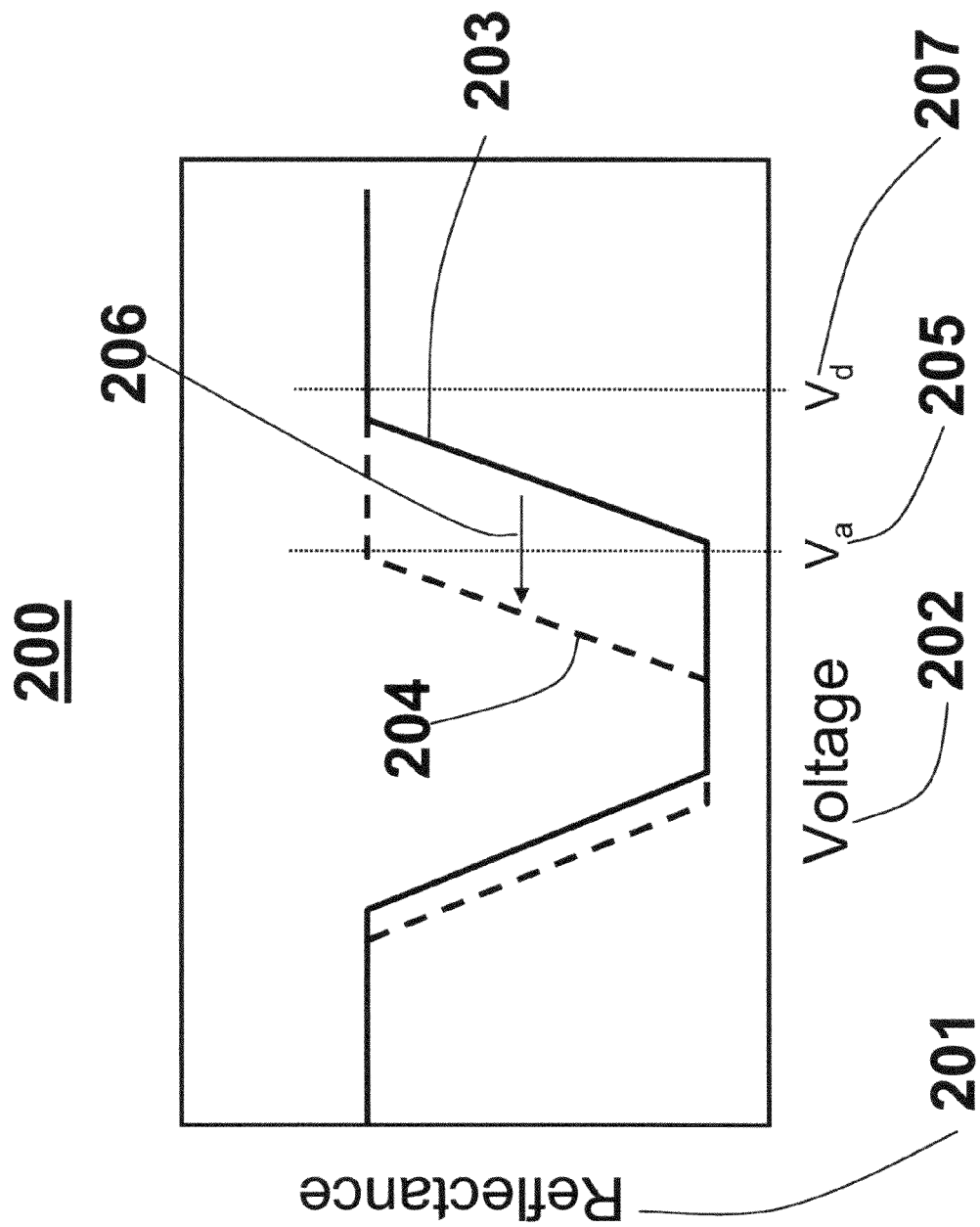
FIG. 6: Illustration of the electrooptical response curves from an exposed portion and an unexposed portion of a photodisplay designed to provide a fixed positive image.

FIG. 6 is used to describe the method of creating a fixed positive image that will remain on the display an indefinite period of time until it is either erased or rewritten with a new image.

FIG. 6 is an illustration 200 of the bathtub shaped electrooptic response curves for the unexposed regions of the liquid crystal layer (curve 203) and the exposed regions of the liquid crystal layer (curve 204) typical of a bistable chiral nematic display as for example described in U.S. Pat. No. 5,453,863. Specifically, 203 is the threshold of the unexposed response curve where the Reflectance 201 rises from the focal conic texture of low reflectance to the planar texture of high reflectance for chiral regions of the display that have not been exposed. In regions that have been suitably exposed with addressing radiation, however, the electrooptic curve and its threshold are changed to 204. This comes about because the pitch length of chiral nematic has changed and hence the drive voltage has changed. In the case of FIG. 6, the pitch length has become longer shifting the voltage threshold curve 204 to lower voltages. When a voltage pulse of value $V_a$, 205, is applied the unexposed regions of the display are switched to the focal conic state while the exposed regions of the display are in the planar state. Since the focal conic state is a thermally stable state, this image is a fixed image and preserved indefinitely without thermal degradation until it is electronically erased. Since it is the unexposed regions that are switched the resulting image is referred to as a fixed positive image.

The fixed image will remain on the display device indefinitely whereas the planar image will thermally degrade. Molecular self diffusion will also not degrade the fixed image. The fixed image can, however, be erased by applying a higher voltage pulse of a value $V_d$ indicated by 207 of FIG. 6 sufficient to drive all the material (exposed and unexposed) into the planar texture. Complete electronic erasure of the fixed image will occur after the planar image has had time to thermally erase. Once erased, a new image can be optically addressed to the photodisplay.

Figure 7:
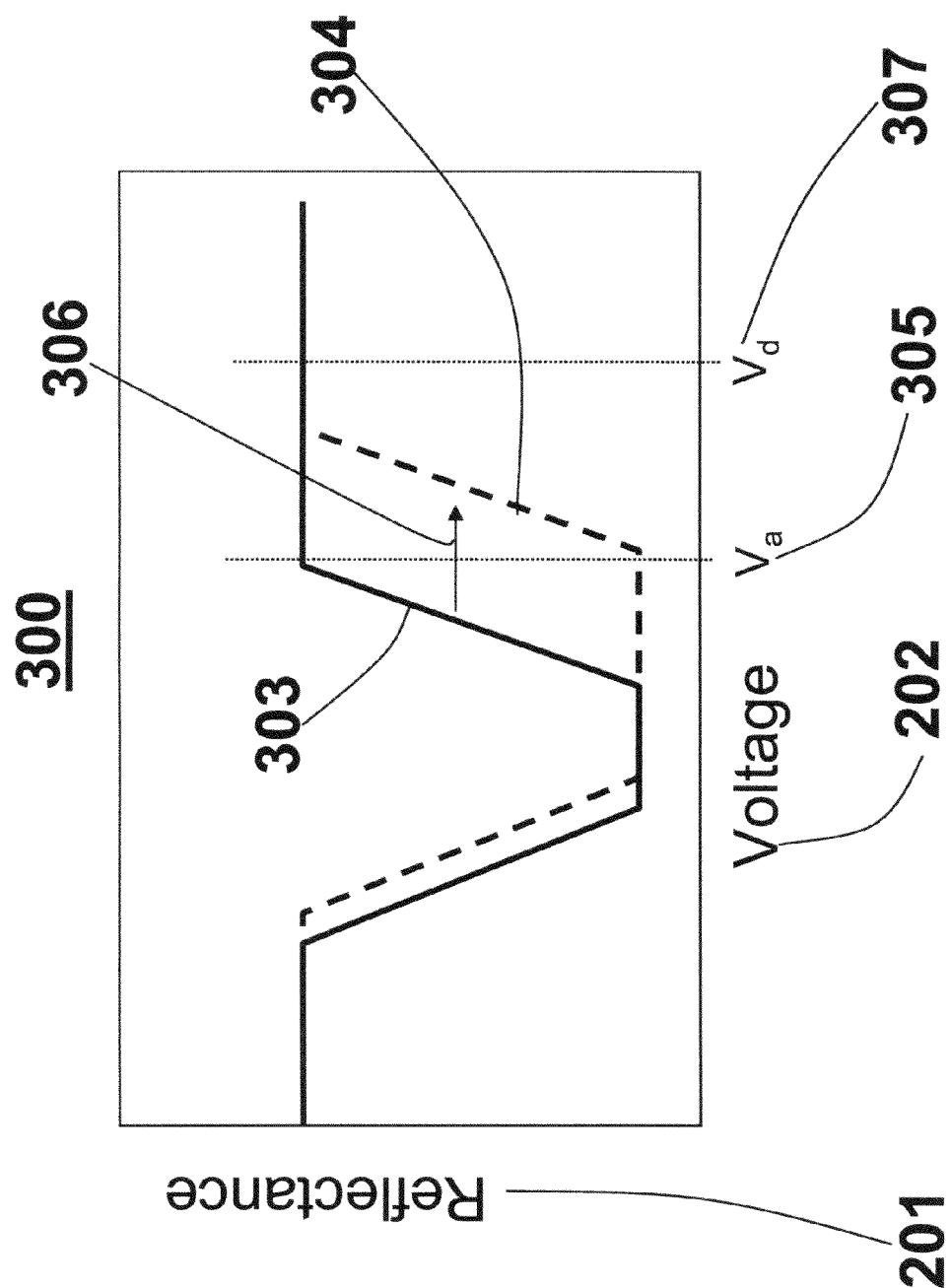
FIG. 7: Illustration of the electrooptical response curves from an exposed portion and an unexposed portion of a photodisplay designed to provide a fixed negative image.

FIG. 7 is used to describe the method of creating a fixed negative image that will remain on the display an indefinite period of time until it is either erased or rewritten with a new image. FIG. 7 is an illustration of the electrooptic response curves for the unexposed regions of the liquid crystal layer (curve 303) and the exposed regions of the liquid crystal layer (curve 304) typical of a bistable chiral nematic display as, for example, described in U.S. Pat. No. 5,453,863. Specifically, 303 is the threshold of the unexposed response curve where the Reflectance 201 rises from the focal conic texture of low reflectance to the planar texture of high reflectance for regions of the display that has not been exposed. In regions that have been suitably exposed, however, the electrooptic curve and its threshold has been changed, 304. This comes about because the pitch length of chiral nematic has changed and hence the drive voltage has changed. In the case of FIG. 7, the pitch length has become shorter shifting the voltage threshold 304 to higher voltages. When a voltage pulse of value $V_a$ 305, is applied, the exposed regions of the display are switched to the focal conic state while the unexposed regions are in the planar state. Since the focal conic state is a thermally stable state, this image is a fixed image and preserved indefinitely without thermal degradation until it is electronically erased. Since it is the exposed regions that are switched the resulting image is referred to as a fixed negative image.

This fixed negative image will remain on the display device indefinitely whereas the planar image will thermally degrade. Molecular self diffusion will also not degrade the fixed image. The fixed image can, however, be erased by applying a higher voltage pulse of a value $V_d$ indicated by 307 of FIG. 7 sufficient to drive all the material (exposed and unexposed) into the planar texture. Complete electronic erasure of the fixed image will occur after the planar image has had time to thermally erase. Once erased, a new image can be optically addressed to the photodisplay.

Figure 8:
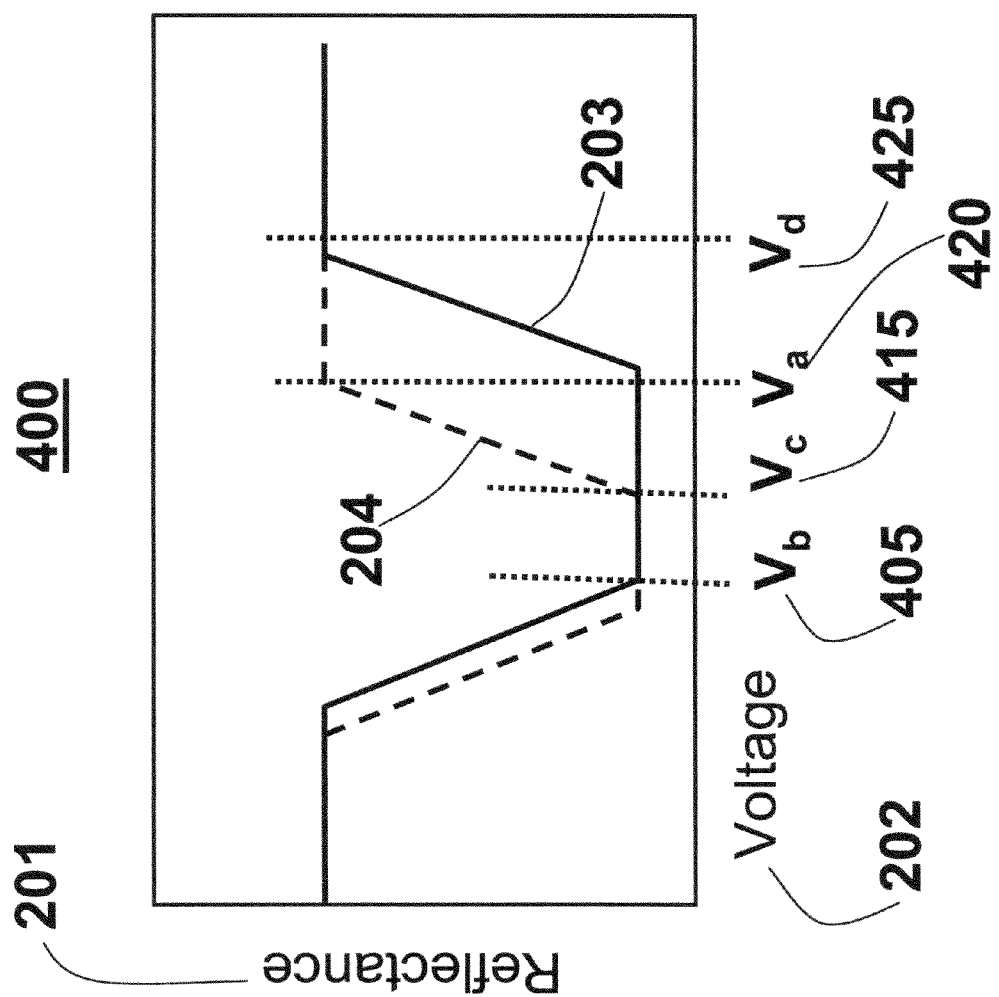
FIG. 8: Illustration of the electrooptical response curves from an exposed portion and an unexposed portion of a photodisplay showing the voltages applied to hide an image in the planar texture.

A planar image in the planar texture can be hidden then made to reappear. This is described with the aid of FIG. 8 which is an illustration of the electrooptical response curves from an exposed portion and an unexposed portion of a photodisplay. Exposure of the display with an image transfers a planar image to the planar texture of the display. Voltages applied to the display in the range between $V_b$ and $V_c$, 405 and 415 will drive the entire display into the focal conic texture whereby the planar image is hidden from view. Applying a voltage pulse of $V_a$ 420 will drive the entire display back into the planar texture where the planar image will reappear. The hidden image can be shown only if the planar image has not been thermally erased. Thermal erasing can be prevented by either switching the image a short time after exposure or using a thermally stable photochiral. The fixed image can, however, be erased by applying a higher voltage pulse of a value $V_d$ indicated by 425 of FIG. 8 sufficient to drive all the material (exposed and unexposed) into the planar texture.

Figure 9:
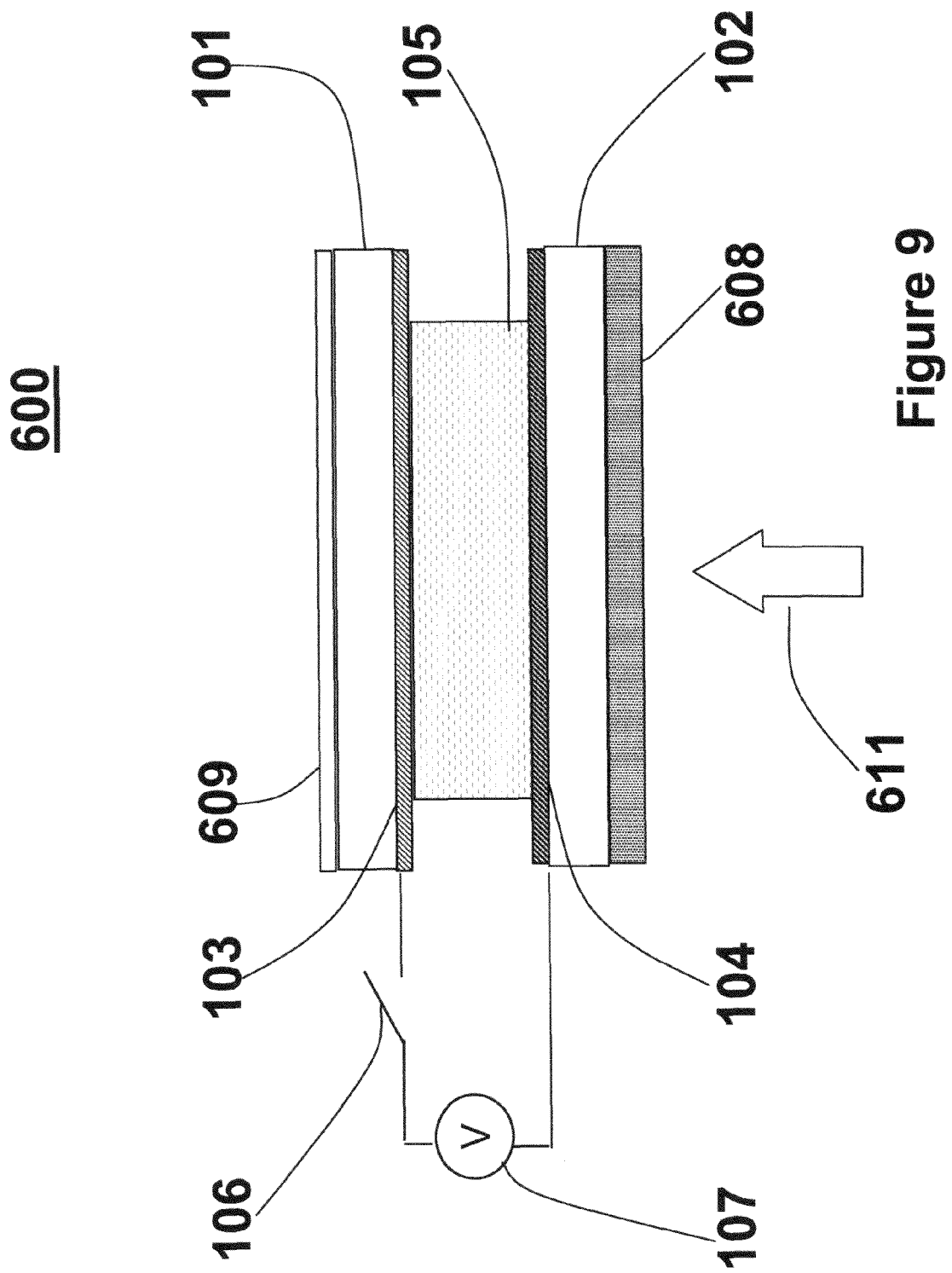
FIG. 9: Schematic side view of the photodisplay cell optically addressed from the non-viewing side.

FIG. 9 shows another embodiment of the photodisplay that is addressed on the non-viewing side of the display. The photodisplay device of FIG. 9 is similar in several ways to the photodisplay device of FIG. 3 except that the light absorbing layer, 108, of FIG. 3 is replaced by an absorbing light filter, 608 in FIG. 9. Filter 608 is transmissive to the UV light that is imaging the display but not transmissive to a segment of the visible spectrum used to view the display and provide contrast to the image. The device of FIG. 9 is addressed on the non-viewing side by ultraviolet light in a direction indicated by arrow, 611. 609 is an optical filter that absorbs UV light and a portion of the visible light spectrum, preventing ambient light used in viewing the display from degrading the image. In cases where ambient light degrades the image, the display needs to be mounted so that the back of the display, 608, is against a wall or shield preventing the ambient light from exposure to the non viewing side.

II. Stacked Photodisplay and Manner of Optically Writing a Digital Image on it

Figure 13:
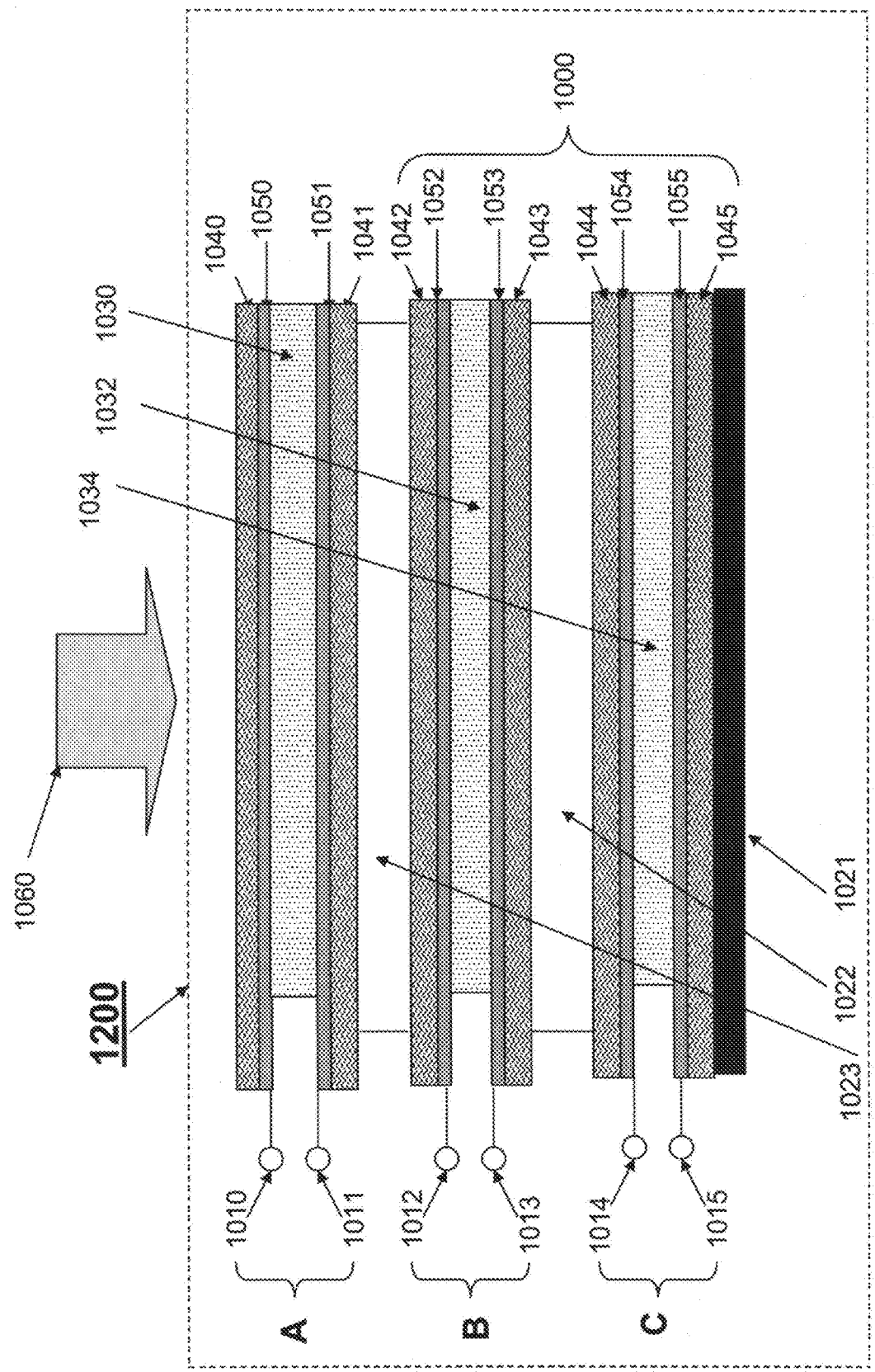
FIG. 13: An illustration of a stacked, multiple color photodisplay.

All aspects of the General Photodisplay disclosed herein are suitable for use in the inventive stacked photodisplay. One embodiment of the stacked photodisplay 1200 of the present invention is illustrated in FIG. 13. The photodisplay 1200 includes three bistable cholesteric photocells. Each may contain a different cholesteric material that exhibits a different Bragg reflective color of different handedness of the reflected circular polarized light, these preferred colors being red, green and blue. The upper photocell, A, includes an upper transparent substrate 1040 and lower transparent substrate 1041 that may be glass, plastic or other suitable transparent material; however, plastic is preferred because of its flexibility. On the inner surface of each substrate 1040 and 1041 is a transparent electrically conductive layer or electrode 1050 and 1051, respectively. Suitable conducting materials for these electrodes are indium tin oxide (ITO) and conducting polymers. However, other transparent conducting materials known in the art of the liquid crystal display technology may be suitable. It is desired that the refractive index of the transparent conducting material be matched as closely as possible to the substrate it contacts in order to prevent undesired reflections. The transparent electrically conductive layers or electrodes 1050 and 1051 do not need to be patterned for the photodisplay cell to exhibit a high resolution image. This feature considerably reduces the cost of manufacturing over a typical electronic LCD.

Sandwiched between the electrodes 1050 and 1051 is a bistable cholesteric liquid crystalline material 1030 containing a reversible photochiral material in which the twisting power can be optically or thermally switched. A preferred photochiral is one that can be switched to one specific twisting power when irradiated with light at a wavelength in the electromagnetic spectrum, e.g., the near ultraviolet, and switched to another specific twisting power when irradiated with light at another wavelength, e.g., in the visible spectrum. An example of such a photochiral material is one of the diaryl ring opening and closing compounds such as found in the article, *Polymers for Advanced Technologies*, Volume 13, pp. 595-600 (2002) by A. Bobrovsky et al. It is to be understood that, as is known in the art of chiral nematic materials (often referred to a cholesteric materials), different chiral compounds may be mixed to achieve the desired twisting power as well as temperature dependence of the twisting power. That is, a photochiral compound may be mixed with another photochiral or a combination with chiral compounds that are not photo sensitive. The photochiral compounds are further mixed with a nematic liquid crystalline material to make a bistable photochiral nematic liquid crystalline material.

In the preferred photodisplay 1200 of FIG. 13 the bistable cholesteric material 1030 has a Bragg reflective wavelength in the blue region of the visible spectrum after exposure to visible white light. Upon exposure to ultraviolet light the twisting power of the photochiral material is altered to decrease the pitch length of the bistable cholesteric material. The decreased pitch length causes a blue-shift (shift to shorter wavelengths) of the reflected wavelength of the liquid crystal material 1030 as well as shifts the electrooptic response curve to higher voltages as described later. A voltage pulse of the appropriate magnitude and time (to be described later) is applied to electrodes 1050 and 1051 of the first (e.g., blue) reflecting cell A by interconnects 1010 and 1011, respectively.

A second photodisplay cell B includes substrates 1042 and 1043 (FIG. 13). On the inner surface of each substrate 1042 and 1043 is a transparent conductor 1052 and 1053, respectively. Like the previously described cell, the transparent electrically conductive layers or electrodes 1052 and 1053 do not need to be patterned. Sandwiched between the electrodes 1052 and 1053 is a bistable cholesteric liquid crystalline material 1032 containing a reversible photochiral material similar to that of the cell A described above. The second photodisplay cell B is identical to the upper photodisplay cell described above except that the liquid crystal material 1032 has a photochiral compound that provides it with a different Bragg reflective wavelength, preferred to be green in this embodiment, after exposure to visible light. Upon exposure to ultraviolet light the twisting power of the photochiral material is altered to decrease the pitch length of the bistable cholesteric material 1032 as well as shift the electrooptic response curve to higher voltages as described later. A voltage pulse of the appropriate magnitude and time (to be described later) is applied to electrodes 1052 and 1053 of the green reflecting cell by interconnects 1012 and 1013, respectively.

A third photodisplay cell C includes substrates 1044 and 1045 (FIG. 13). On the inner surface of each substrate 1044 and 1045 is a transparent electrically conductive layer or electrode 1054 and 1055, respectively. Like the second cell B, the transparent electrodes 1054 and 1055 do not need to be patterned. Sandwiched between the electrodes 1054 and 1055 is a bistable cholesteric liquid crystalline material 1034 containing a reversible photochiral material similar to that of the first and second cells described above. The third photodisplay cell is identical to the first and second photodisplay cells described above except that the liquid crystal material 1034 has a photochiral compound that provides it with a different Bragg reflective wavelength, preferred to be red in this embodiment, after exposure to visible light. Upon exposure to ultraviolet light the twisting power of the photochiral material is altered to decrease the pitch length of the bistable cholesteric material as well as shift the electrooptic response curve to higher voltages as described later. A voltage pulse of the appropriate magnitude and time (to be described later) is applied to electrodes 1054 and 1055 of the red reflecting cell by interconnects 1014 and 1015 respectively.

It is to be appreciated that the sequence of colors reflected by each of the photodisplay cells A, B and C in the stack of FIG. 13 may be other than blue, green and red from top to bottom. In fact, the colors reflected by each photodisplay cell in the stack of FIG. 13 may include colors other than blue, green and red depending on the effect one desires for the image. The preferred blue, green, red colors and sequence above are chosen to provide good color performance for additive color mixing of the primary colors so that a full color reflective image can be created using gray scale levels addressed on each of the primary color photodisplay cells in a manner known in the art.

In photodisplay 1200 of FIG. 13, index of refraction matching material 1023 is placed between the upper and second photodisplay cells A and B, and index of refraction matching material 1022 is placed between the second and third photo display cells B and C in order to match the indexes of refraction between adjacent substrates thereby providing good optical performance of the photodisplay. Suitable refraction index matching materials include transparent adhesives such as Norland 65. Optical or thermally cured adhesives are preferred for the index matching materials but transparent liquids with a refractive index similar to that of the substrate can be used. The photodisplay of FIG. 13 is exposed by light as well as viewed from above in a direction indicated by arrow, 1060. The side opposite the exposed side, that is the bottom side of the photodisplay 1200 of FIG. 13, is coated with a light absorbing material 1021. A preferred color of the light absorber 1021 is black and can be a black paint that will adhere to the substrate.

Figure 14:
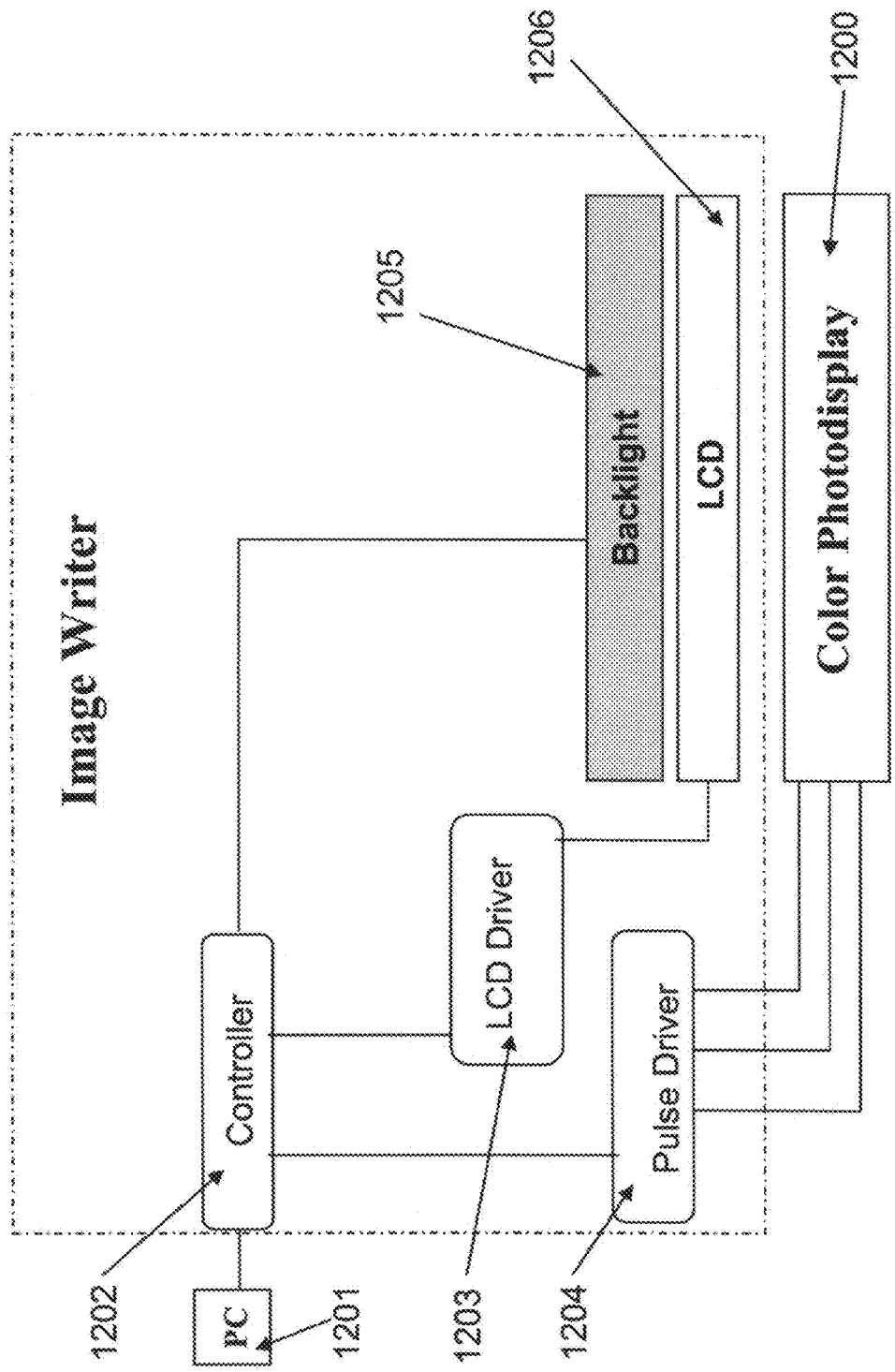
FIG. 14: A schematic diagram of an optical writer based on an LCD for addressing a photodisplay with a digital image.

The photodisplay 1200 is addressed by exposure of optical images onto the upper surface of the photodisplay in a direction indicated by the arrow 1060. The image may be created by irradiating light through a mask of the image or preferably by an optical writing device capable of optically projecting a digital image onto the photodisplay. One embodiment of an optical writer is schematically illustrated in FIG. 14 where a digital image obtained, for example, by a digital camera is written or addressed onto the photodisplay by use of a liquid crystal display (LCD). In this embodiment the LCD acts as a photomask. The digital image is stored, for example, in a personal computer (PC, 1201) which is electronically processed by the computer into a controller 1202. The controller 1202 serves several purposes, one of which is to turn on and off (energize and de-energize) the lamps in the backlight 1205. The backlight 1205 may have two separate light sources, a lamp that emits in the ultraviolet (UV) region of the electromagnetic spectrum and a lamp that emits visible light. Controller 1202 can turn on or off either lamp as needed. Controller 1202 can also send the blue, green and red components of the digital signal to the LCD 1206 via LCD driver 1203 when needed in which case the LCD 1206 acts a mask to allow the digital image to be projected onto the surface of the photodisplay 1200 from the light of backlight 1205. The controller 1202 can allow either the blue, green or red component of the digital image to be optically projected onto the photodisplay as needed.

A further function of controller 1202 is to signal the pulse driver 1204 to apply the appropriate voltage pulse to the electrodes of the photodisplay. Pulse driver 1204 can supply two types of pulses to the photodisplay, an erase pulse or a fixing pulse. An erase pulse is a voltage pulse of sufficient magnitude to drive the bistable chiral nematic material to the planar texture whereas a fixing pulse is a pulse of sufficient magnitude to drive the same material to the focal conic texture. The magnitude of the pulse, as determined by the pulse height and width, to achieve the planar or focal conic texture is well known in the art (see, for example, Proceedings of *Japan Display* '92 (Hiroshima), pp. 73-76 (1992) by J. W. Doane et al.). The voltage pulses from pulse driver, 1204 of FIG. 14 are applied to the transparent conducting electrodes of the photodisplay in FIG. 13 via: interconnects 1010 and 1011 for the upper (e.g., blue) cell (electrodes 1050, 1051); interconnects 1012 and 1013 for the second (e.g., green) cell (electrodes 1052, 1053); and interconnects 1014 and 1015 of the third (e.g., red) cell (electrodes 1054, 1055).

Figure 15:
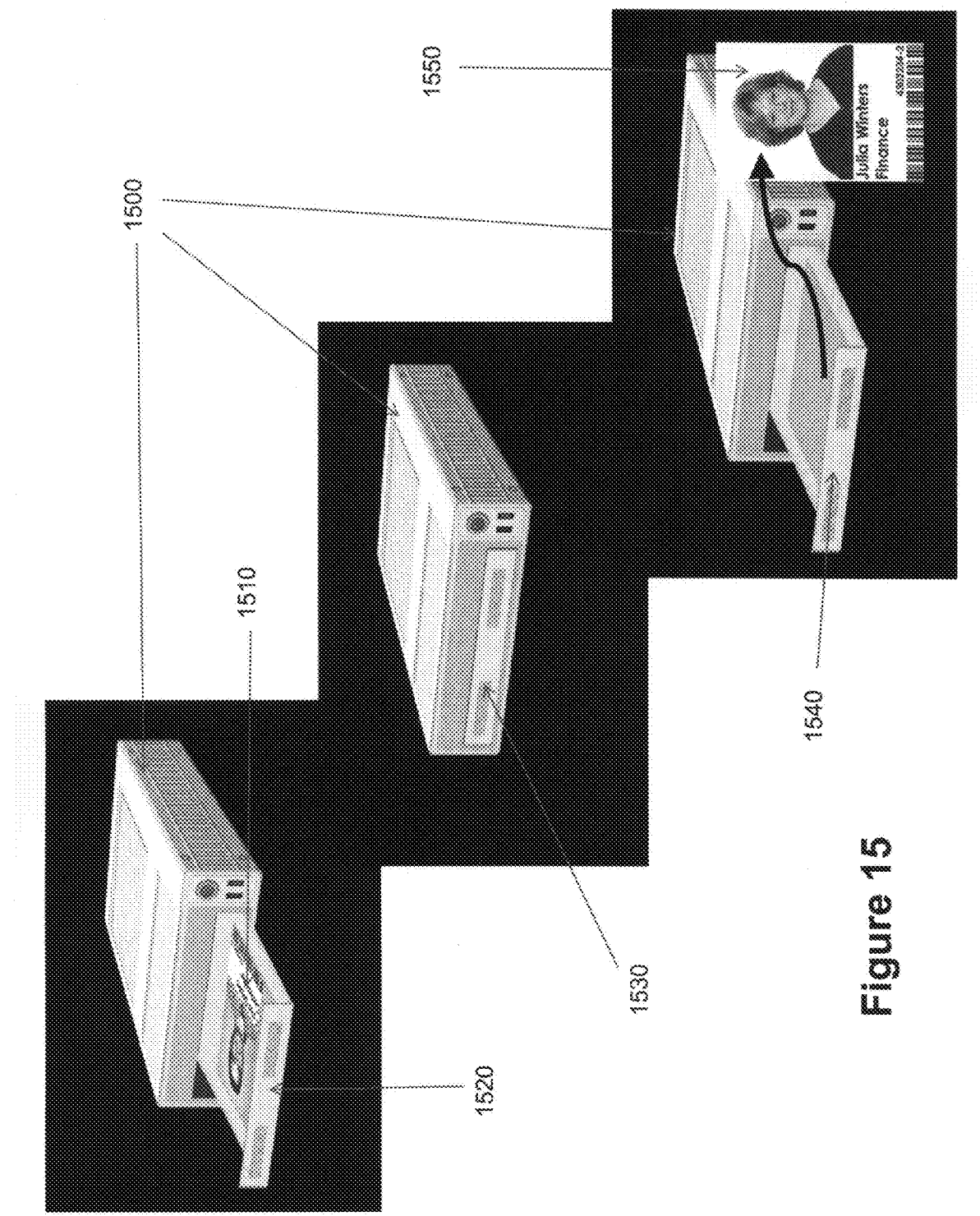
FIG. 15: Artist's rendering of an LCD digital optical writer.

FIG. 15 shows an artist's rendering of a digital optical writer illustrating its use in addressing a new image on an ID badge photodisplay. Three views of the digital optical writer 1500 are shown: The optical writer with open drawer 1520 containing an ID badge photodisplay 1510 placed in the writer for the purpose of optically writing a new image; the optical writer with closed drawer 1530 while the old image is being erased and a new image being optically written on ID badge photodisplay; the optical writer with open drawer 1540 and the ID badge photodisplay 1550 removed with a new digital image.

Other embodiments of a digital optical image writer utilize a different type of display other than an LCD. An example is the optical image projection display such as a deformable mirror display (DMD) to project digital images onto the photodisplay. Examples of DMDs are disclosed in U.S. Pat. Nos. 4,566,935 and 4,680,579 and in PCT publication WO 92/09065, which are incorporated herein by reference in their entireties. Other possible displays that may be used to write a digital optical image are light emitting diode (LED) displays or other emissive display technologies.

We now turn to the method or procedure for addressing an image on the stacked photodisplay 1200 employing photochiral materials that are switched to a specific twisting power with UV light and back to the original twisting power with visible light (i.e., the photochiral material is reversible). Furthermore we employ concentrations of the chiral materials that are adjusted so that, in the presence of ambient light for viewing the display, each of the display cells reflect blue, green and red light, respectively. The ambient light is visible light but may contain some background UV. The following sequence using the optical writer of FIG. 14 is used to address a color image on the photodisplay stack of FIG. 13 starting with the stacked cell that has been exposed to visible light a significant amount of time such that cells in the stack reflect their respective blue, green and red colors.

A voltage erase pulse from the pulse driver 1204 of sufficient magnitude to drive a display cell A to the planar texture is applied to the electrodes: 1050 and 1051 of the upper cell; 1052 and 1053 of the second cell B; and 1054 and 1055 of the third cell C via interconnects 1010 and 1011, 1012 and 1013, 1014 and 1015, respectively. The pulses may be applied to each of the cells simultaneously if desired.

1. The blue portion of the digital signal is then electrically addressed on the electronic digital display of the writer as, for example, illustrated by the LCD driver 1203 and LCD digital display 1206 of FIG. 14. By reference to the blue portion of the digital signal is meant the digital signal portion from the LCD that forms the blue component of the image that will be displayed by the photodisplay 1200. The UV lamp of backlight 1205 is then turned on to irradiate photodisplay 1200. The digital LCD 1206 now acts as a mask that represents the blue image component. Depending upon the image on the mask, certain regions of each of the blue, green and red cells of photodisplay 1200 will be exposed with UV light from the LCD 1206 whereas other regions are unexposed. It is important in this embodiment that substrates 1040, 1041, 1042, 1043, 1044 and 1045 of FIG. 13 allow passage of UV light so that all display cells, blue, green and red can be exposed.

To discuss the intensity and duration of exposure we turn to FIG. 6 which is a simulation of typical electrooptic response curves. These are plots of the reflectance of a cell versus the voltage applied to the cell electrodes. The solid curve 203 is a plot of the electrooptic response before exposure to UV light; however, following exposure the response curve is shifted as illustrated by dashed curve 204. Regions of the photodisplay that are exposed by UV light are determined by UV light passing through the image on LCD 1206. The electrooptic curve is shifted for portions of each of the display cells that are exposed by UV (curve 204); whereas, it is not shifted for the regions unexposed to UV (curve 203). The intensity and duration of UV exposure to the photodisplay must be sufficient to shift the electrooptic curves of the blue cell as illustrated in FIG. 6 such that there is a voltage Va that will drive the exposed regions (curve 204) to the planar texture but drive the unexposed regions (curve 203) to the focal conic texture.

2. A voltage pulse of sufficient magnitude to drive the unexposed regions of the display cell A to the focal texture is applied across the electrodes 1050 and 1051 of the cell A in order to fix the blue component of the image. This fixing pulse is supplied by pulse driver 1204 to the photodisplay 1200 of FIG. 14. The voltage of the fixing pulse is determined by the electrooptic curves illustrated in FIG. 6 and shown as Va 205. A fixing pulse of voltage Va will drive the regions of the bistable cholesteric material that have been exposed (dashed curve 204) to the planar texture of high reflectance; however, the fixing pulse of voltage Va will drive the unexposed regions (curve 203) to the focal conic texture of low reflectance.

3. The display stack 1200 is then irradiated with visible light to erase the all-planar images from display cells B and C as well as shifting their Bragg reflective color of cell A back to its original blue color. This is accomplished by controller 1202 turning on the visible lamp of the backlight 1205 as well as erasing the image from LCD 1206 such that all regions of each of the blue, green and red cells are exposed to visible light of sufficient intensity to return the bistable cholesteric material in each of the cells to their original respective blue, green and red color. Note that the fixed blue image remains on the blue display because it is the only cell to which the fixing voltage was applied forming a stable focal conic texture, whereas an image on the planar texture of the green and red cells resulting from exposure of the blue image component will be erased.

4. The photodisplay stack 1200 is now irradiated with a UV image of the green portion of the digital signal as accomplished by controller 1202 first addressing the green portion of the digital color image to LCD 1206 via LCD driver 1203 and turning on the UV lamp of backlight 1205 to irradiate photodisplay 1200. Reference to the green portion of the digital signal means the digital signal portion from the LCD that forms the green component of the image that will be displayed by the photodisplay 1200. The intensity and duration of UV exposure to the photodisplay must be sufficient to shift the electrooptic curves of the green cell, as illustrated in FIG. 6, such that there is a voltage Va that will drive the exposed regions (curve 204) to the planar texture but drive the unexposed regions (curve 203) to the focal conic texture. After the UV lamp is turned off by the controller 1202, a fixing pulse of voltage Va is applied to interconnects 1012 and 1013 of the green display to fix the image with the focal conic state.

5. The display stack is again irradiated with visible light to erase the green digital image from display cells C and A while shifting the color of the image on cell B back to green. This is accomplished by controller 1202 turning on the visible lamp of the backlight 1205 as well as removing the image from LCD 1206 such that all regions of each of the blue, green and red cells are exposed to visible light of sufficient intensity to return the bistable cholesteric material in each of the cells to their original respective blue, green and red color. Note that the fixed blue and green images remain on the respective blue and green display cells because they are stabilized by the focal conic texture whereas an image on the planar texture of the red cell resulting from exposure of the green image component will be erased.

6. The display stack 1200 is now irradiated with a UV image of the red portion of the digital signal as accomplished by controller 1202 first addressing the red portion of the digital color image to LCD 1206 via LCD driver 1203 and turning on the UV lamp of backlight 1205 to irradiate photodisplay 1200. Reference to the red portion of the digital signal means the digital signal portion from the LCD that forms the red component of the image that will be displayed by the photodisplay 1200. The intensity and duration of UV exposure to the photodisplay must be that sufficient to shift the electrooptic curves of the red cell, as illustrated in FIG. 6, such that there is a voltage Va that will drive the exposed regions (curve 204) to the planar texture but drive the unexposed regions (curve 203) to the focal conic texture. After the UV lamp is turned off by controller 1202, a fixing pulse of voltage Va is applied to interconnects 1014 and 1015 of the red display cell by pulse driver 1204 to fix the image with the focal conic state.

7. The photodisplay stack 1200 is then irradiated with visible light to erase the digital red image from cells A and B and by placing all the display cells in the photodisplay stack to reflect their original colors blue, green and red. As before, this is accomplished by controller 1202 turning on the visible lamp of the backlight 1205, as well as removing the red image from LCD 1206 whereby all regions of each of the blue, green and red cells are exposed to visible light of sufficient intensity to return the bistable cholesteric material in each of the cells to their original respective blue, green and red color. The fixed blue, green and red images remain on their respective display cells because they are stabilized by the focal conic state. Reflective light from each of the display cells of the photodisplay displays the fixed blue, green and red images, which additively mix in the stacked assembly to provide an RGB multiple color image on the display. Eight colors are possible in the procedure described.

8. The color image then remains on the display indefinitely; however, it can be erased at any later time as desired. This is accomplished by applying an erasure pulse to each of the display cells via pulse driver 1204 that drives each of the display cells to the planar texture. The voltage of the erasure pulse is illustrated in FIG. 6 as Vd 207.

A full color image with more than eight colors can be addressed to photodisplay 1200 by incorporating gray scale in each of the primary color images. There are several ways this may be accomplished. One means is by spatial dithering each of the primary colors as is known in that art. Gray scale can also be accomplished by taking advantage of the gray levels of the electrooptic curve; see for example U.S. Pat. No. 6,268,839. Additive color mixing provides a full color image as described, for example, in U.S. Pat. No. 6,377,321.

Another embodiment of the triple stack is a black on white display. In such a display, each of the cells would be addressed with the same image so that reflections from each of the cells displays the blue, green and red fixed images from the stacked photodisplay, which would additively mix to give a white reflection on a black background. The black background is formed by incident light passing through the focal conic texture of each liquid crystal layer and being absorbed by the black back layer 1021.

In another embodiment of the triple stack photodisplay, the photochiral materials of the green reflective cell could be of the opposite chirality from the red and blue cells, for example, so as to provide for a brighter image in the case where the bandwidth of blue, green and red reflection are broad enough to overlap.

Double stack photodisplay embodiments are also possible that are addressed in the same manner as the triple stack. A monochrome double stack display with both displays cells of the same color but of opposite chirality yields an image of enhanced brightness over a single cell photodisplay. In this case the same image is addressed to each cell.

A double stack photodisplay could also have cholesteric material of a pitch length that produces different colors from each cell. The black layer could be black or a certain color. One aspect of the double cell photodisplay 1000 is the same as the photodisplay shown in FIG. 13 except it does not have cell A or index matching material 1023 and the two colors that cells B and C individually reflect in ambient light can be any colors produced by adjusting the chiral concentration and resulting pitch length of the cholesteric liquid crystal material of each cell. The top surface of the display is formed by substrate 1042 and the bottom of the display is formed by the black layer 1021. First and second fixed color image portions are written on cells B and C of the double stack photodisplay 1000 (and the double stack photodisplay 1500 discussed below), the planar image is erased, and the entire photodisplay is erased, in the same manner described above for the triple stack photodisplay as would be appreciated by those skilled in the art in view of this disclosure.

A stack of six display cells in which each of the three primary colors is a double stack of a left and right chirality can maximize the brightness of a color photodisplay.

Figure 16:
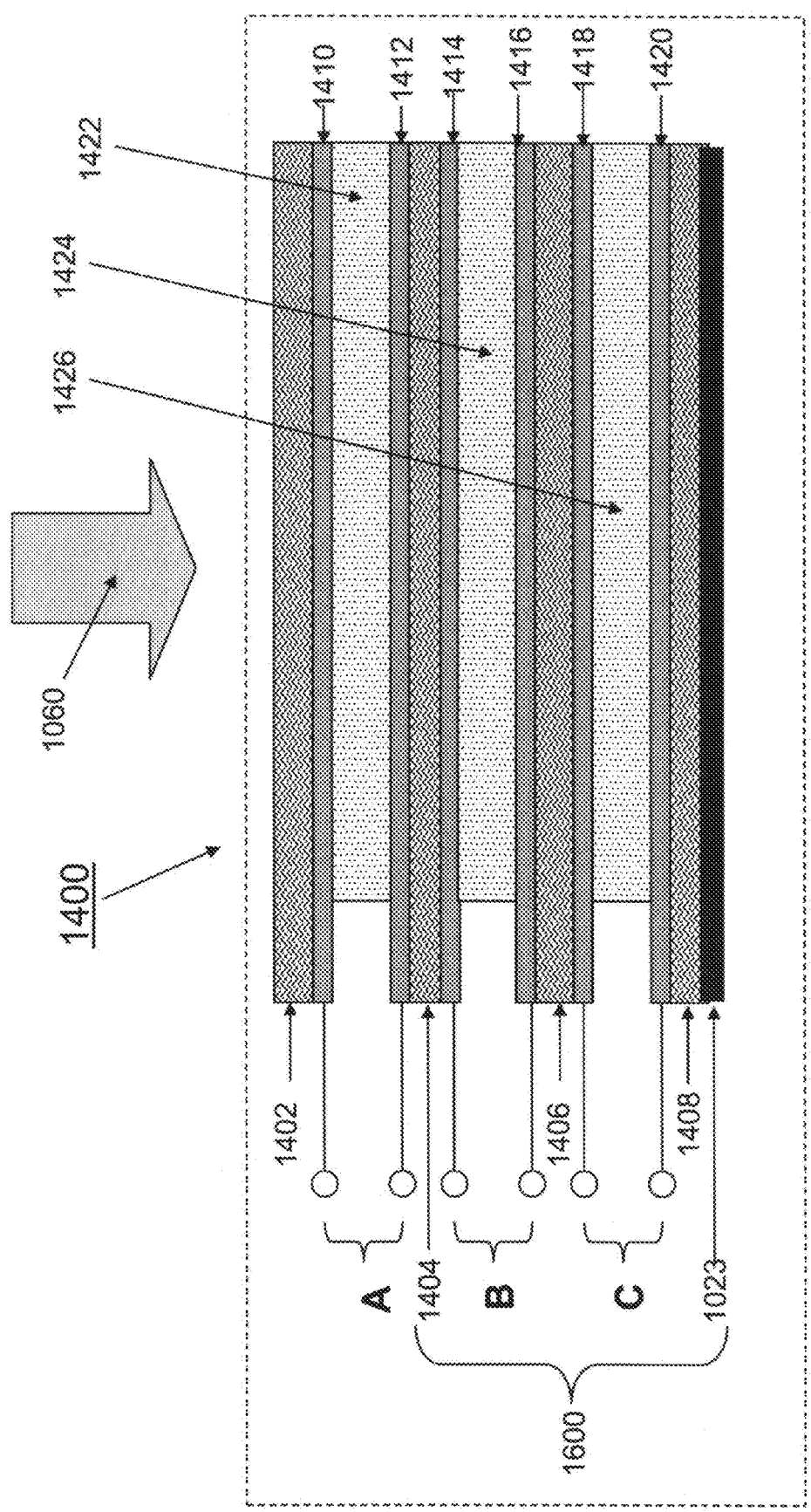
FIG. 16: An illustration of another embodiment of a stacked, multiple color photodisplay.

There are also ways to fabricate stacked cells with fewer substrates. One such embodiment is to have the transparent conductors share the same substrate as illustrated in FIG. 16. Turning to FIG. 16, a triple cell photodisplay 1400 is illustrated with substrates 1402, 1404, 1406 and 1408 containing transparent conductors 1410, 1412, 1414, 1416, 1418 and 1420 disposed on the substrates as illustrated. Sandwiched between the conductors are photochiral liquid crystalline materials 1422, 1424 and 1426 producing Bragg reflective colors blue, green and red, respectively. Such a display is advantageous in that there are fewer substrates to pass UV and visible light and hence less overall unwanted absorption and reflection of the light by the substrates. A double stack photodisplay 1600 having shared electrodes is the same as the triple stack photodisplay shown in FIG. 16 except it does not include substrate 1402, liquid crystal layer 1422, and electrodes 1410, 1412. The outer top layer of the photodisplay 1600 is formed by substrate 1404 and the bottom layer of the photodisplay 1600 is formed by black layer 1023. The photodisplay 1600 has display cells B and C.

It is possible to make a stack of blue, green, red bistable photochiral chiral nematic material layers with only one substrate. This is done with the use of a dispersion of droplets of the bistable photochiral material such can be made with emulsions or by phase separation; see U.S. Pat. No. 7,236,151 (flexible and drapable LCDs) and U.S. Pat. No. 7,170,481 (single substrate LCD), which are incorporated herein by reference in their entireties. In this case, the emulsion dispersion as well as the transparent conductors are coated in sequence on a substrate and dried to make a stack of displays cells.

Figure 10:
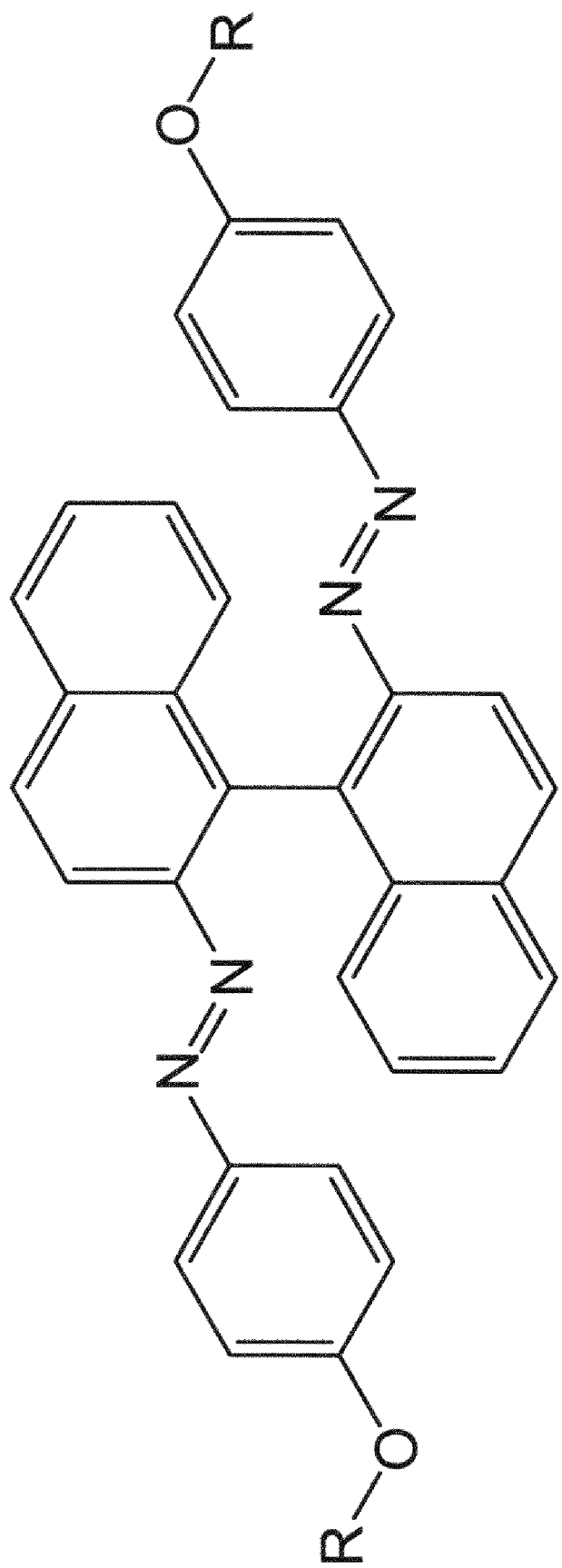
FIG. 10: Molecular structures of the specific exemplary compounds (Example 1).
Figure 11:
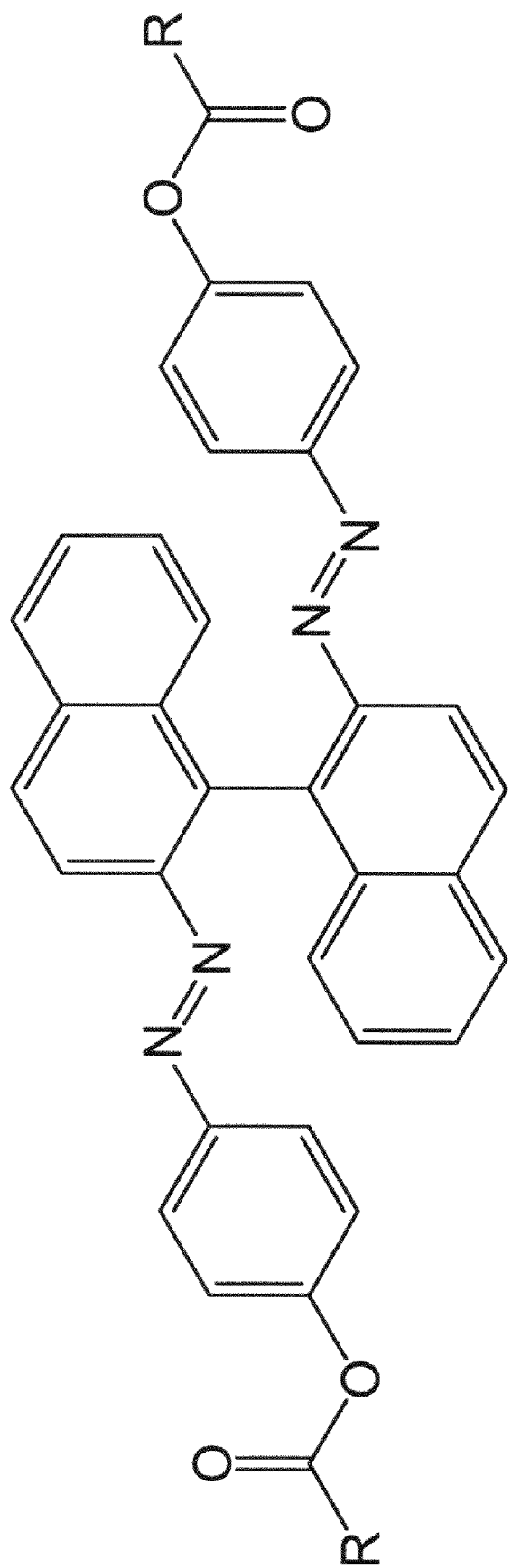
FIG. 11: Molecular structures of the specific exemplary compounds (Example 1).

A preferred aspect of the invention utilizes photochiral compounds such as the diaryl compounds (A. Bobrovsky et al., *Polymers for Advanced Technologies*, Vol. 13, pp. 595-600 (2002) that are reversible by exposure of UV light and visible light. However, it is to be understood that other photochiral compounds may also be utilized such as azo compounds (see FIG. 10) that are reversible thermally; that is, optically driven to one twisting power with UV light and reversed to the original twisting power by thermal agitation. In the use of such compound the inventive color photodisplay (e.g., 1200 of FIG. 13) would be addressed with UV light as before; however, instead of irradiating the sample with visible light before addressing the next cell in the stack, one would simply pause the procedure to give time for the planar texture of all the cells to reverse back to their original color thermally; a process that is sped up by heating the sample (see Example 7). A disadvantage is the increase in overall time for optically addressing the photodisplay.

Another aspect of the stacked photodisplay is to utilize a mixture of chiral and photochiral compounds in which the exposed regions of the display are shifted to higher voltages (shorter wavelengths) as illustrated in FIG. 7. This has the effect of creating a negative rather than a positive image on the display. Liquid crystalline materials and voltages suitable for producing negative or positive images in the stacked photodisplay are described above and in the Examples.

All embodiments can be viewed in most room light conditions without significant shifting of the colors provided the chiral concentration was set under similar room lighting conditions. In cases where there is a significant change in the ambient light used to view the display a UV filter on the surface of the display could be used to prevent such color shifts; however, the filter would need to be removed while the display was being addressed with a new image.

GENERAL PHOTODISPLAY EXAMPLES

The following examples are presented to illustrate the practice of this invention but are not meant to limit it in any way. All percentages are by weight unless otherwise indicated.

Example 1

Reversible photo responsive chiral compounds of the structure diagramed in FIG. 1 with end chains: 3a) $R=OC_8H_{17}$, 3b) $R=OC_{10}H_{21}$, 3c) $R=OC_{12}H_{25}$, and 3d) $R=OC_{14}H_{29}$ respectively were synthesized to explore their physical characteristics for photodisplay applications. In addition reversible photo responsive chiral compounds of the structure diagramed in FIG. 2 with end chains $R=C_nH_{2n+1}$ (e.g. 4a $R=C_{11}H_{23}$ and 4b $R=C_2H_5$) respectively were also synthesized for comparison.

The reversible photo responsive chiral compounds were synthesized according to the following scheme.

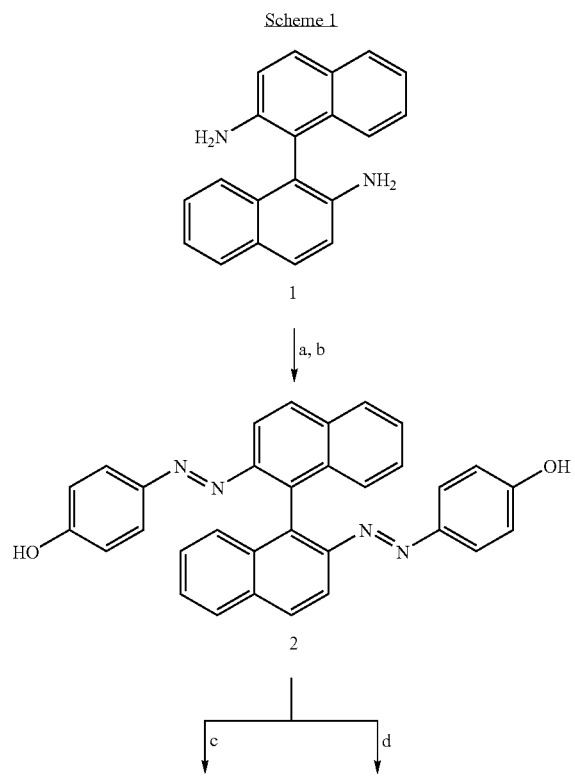

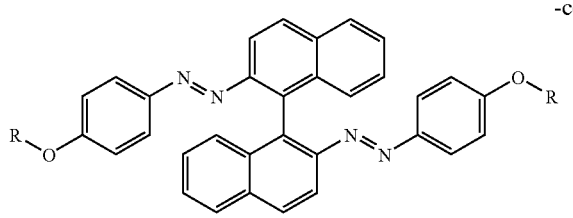
3

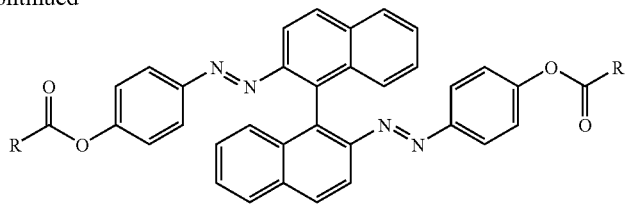
4 a (i) Aqueous HCl or H$_2$SO$_4$, (ii) NaNO$_2$
b Phenol, NaOH, H$_2$O
c RBr, K$_2$CO$_3$, DMF
d RCOCl, Et$_3$N, CH$_2$Cl$_2$ Synthesis of the intermediate 2:

(S)-(−)-1,1'-Binaphthyl-2,2'-diamine or (R)-(+)-1,1'-binaphthyl-2,2'-diamine (1.00 g, 3.52 mmol) was dissolved in a solution of H$_2$O (17 mL) and concentrated HCl (2.5 mL). The solution was cooled to 0° C. at ice water bath. A solution of sodium nitrite (0.58 g, 8.44 mmol) in H$_2$O (10 mL) was dropped at ice water bath with stirring. The resulting brown yellow suspension was dropped to the solution of Phenol (0.73, 7.74 mmol) and NaOH (0.90 g, 22.60 mmol) in H$_2$O (15 mL). The suspension was acidified with aqueous HCl and filtered. The precipitate was washed with H$_2$O, dried to get the crude 2, which was purified by chromatography on silica gel to give a solid in 80-90% yields.

The general procedure for the synthesis of the photo responsive chiral compound 3:

The mixture of the intermediate 2 (1.40 mmol), alkyl bromide (4.20 mmol) and potassium carbonate (4.20 mmol) in DMF (50 mL) was heated with stirring for 5-48 h. The resulting mixture was evaporated to dryness under reduced pressure. The residue was purified by chromatography on silica gel to get the chiral compounds 3 in 60-90% yields.

For example:

(S)-(−) Binaphthyl diazo compound 3a: mp 93-94° C. $^1$H NMR (CDCl$_3$): δ 0.87 (t, 6H), 1.26 (m, 20H), 1.70 (m, 4H), 3.88 (t, 4H, J=6.6 Hz), 6.71 (d, 4H, J=8.8 Hz), 7.27 (m, 2H), 7.30 (d, 4H, J=9.2 Hz), 7.48 (m, 4H), 7.97 (d, 2H, J=8.2 Hz), 8.04 (d, 2H, J=9.0 Hz), 8.16 (d, 2H, J=9.2 Hz); $^{13}$C NMR (CDCl$_3$): δ14.05, 22.61, 25.93, 29.11, 29.17, 29.26, 31.77, 68.22, 114.43, 114.49, 124.57, 126.51, 126.84, 127.82, 128.01, 128.92, 134.20, 134.34, 136.62, 147.27, 148.37, 161.27; MALDI-TOF MS (M+Na) calcd for C$_{48}$H$_{54}$N$_4$O$_2$Na: 741.4144, found: 741.4131; Anal. calcd for C$_{48}$H$_{54}$N$_4$O$_2$: C, 80.19; H. 7.57; N, 7.79. Found: C, 80.27; H, 7.40; N, 7.74.

(S)-(−) Binaphthyl diazo compound 3b: mp 89-90° C. $^1$H NMR (CDCl$_3$): δ 0.86 (t, 6H), 1.25 (m, 28H), 1.71 (m, 4H), 3.88 (t, 4H, J=6.5 Hz), 6.71 (d, 4H, J=9.0 Hz), 7.27 (m, 2H), 7.29 (d, 4H, J=9.0 Hz), 7.47 (m, 4H), 7.97 (d, 2H, J=8.2 Hz), 8.04 (d, 2H, J=9.2 Hz), 8.15 (d, 2H, J=9.2 Hz); $^{13}$C NMR (CDCl$_3$): δ14.09, 22.67, 25.95, 29.13, 29.29, 29.32, 29.53, 31.82, 68.23, 114.42, 114.49, 124.56, 126.49, 126.82, 127.81, 127.99, 128.90, 134.19, 134.33, 136.60, 147.25, 148.35, 161.24; MALDI-TOF MS (M+H) calcd for C$_{52}$H$_{63}$N$_4$O$_2$: 775.4951, found: 775.4960; Anal. calcd for C$_{52}$H$_{62}$N$_4$O$_2$: C, 80.58; H, 8.06; N, 7.23. Found: C, 80.33; H, 7.79; N, 7.10.

(S)-(−) Binaphthyl diazo compound 3c: mp 76-77° C. $^1$H NMR (CDCl$_3$): δ 0.87 (t, 6H), 1.25 (m, 36H), 1.71 (m, 4H), 3.88 (t, 4H, J=6.6 Hz), 6.70 (d, 4H, J=8.8 Hz), 7.27 (m, 2H), 7.30 (d, 4H, J=8.8 Hz), 7.47 (m, 4H), 7.76 (d, 2H, J=8.2 Hz), 8.03 (d, 2H, J=9.0 Hz), 8.15 (d, 2H, J=9.0 Hz); $^{13}$C NMR (CDCl$_3$): δ 14.08, 22.66, 25.94, 29.11, 29.32, 29.52, 29.55, 29.61, 31.90, 68.23, 114.43, 114.49, 124.57, 126.51, 126.84, 127.82, 128.00, 128.91, 134.20, 134.33, 136.62, 147.25, 148.36, 161.27; MALDI-TOF MS (M+Na) calcd for C$_{56}$H$_{70}$N$_4$O$_2$Na: 853.5396, found: 853.5390; Anal. calcd for C$_{56}$H$_{70}$N$_4$O$_2$: C, 80.92; H, 8.49; N, 6.74. Found: C, 80.07; H, 8.37; N, 6.71.

(S)-(−) Binaphthyl diazo compound 3d: orange crystal, mp 52-54° C. $^1$H NMR (CDCl$_3$): δ 0.88 (t, 6H), 1.25 (m, 44H), 1.71 (m, 4H), 3.88 (t, 4H, J=6.6 Hz), 6.70 (d, 4H, J=8.6 Hz), 7.27 (m, 2H), 7.29 (d, 4H, J=9.2 Hz), 7.47 (m, 4H), 7.96 (d, 2H, J=8.0 Hz), 8.03 (d, 2H, J=8.8 Hz), 8.15 (d, 2H, J=9.2 Hz); $^{13}$C NMR (CDCl$_3$): δ14.06, 22.65, 25.91, 29.08, 29.30, 29.50, 29.53, 29.61, 31.89, 68.17, 114.37, 114.45, 124.51, 126.44, 126.77, 127.76, 127.94, 128.84, 134.14, 134.28, 136.56, 147.21, 148.31, 161.19; MALDI-TOF MS (M+H) calcd for C$_{60}$H$_{79}$N$_4$O$_2$: 887.6203, found: 887.6212; Anal. calcd for C$_{60}$H$_{78}$N$_4$O$_2$: C, 81.22; H, 8.86; N, 6.31. Found: C, 81.47; H, 8.86; N, 6.17.

The general procedure for the synthesis of the photo responsive chiral compound 4:

A solution of acyl chloride (1.4 mmol) in CH$_2$Cl$_2$ (10 mL) was added to the mixture of the intermediate 2 (0.7 mmol) and Et$_3$N (1.4 mmol) in CH$_2$Cl$_2$ (10 mL). The mixture was stirred for 1-5 h. The resulting mixture was evaporated to dryness under reduced pressure. The residue was purified by chromatography on silica gel to get orange solid 4 in 50-95% yields.

For example:

(S)-(−) binaphthyl diazo compound 4a (R=C$_{11}$H$_{23}$): mp 55-56° C.; Yield: 66%; $^1$H NMR (CDCl$_3$): δ 0.88 (t, 6H), 1.26 (m, 32H), 1.66 (m, 4H), 2.49 (t, 4H, J=7.3 Hz), 6.94 (d, 4H, J=9.2 Hz), 7.30 (m, 2H), 7.32 (d, 4H, J=9.2 Hz), 7.49 (m, 4H), 7.98 (d, 2H, J=8.2 Hz), 8.05 (d, 2H, J=8.8 Hz), 8.14 (d, 2H, J=8.8 Hz); $^{13}$C NMR (CDCl$_3$): δ 14.06, 22.64, 24.85, 29.02, 29.19, 29.28, 29.39, 29.54, 29.67, 31.87, 34.33, 114.19, 121.80, 123.85, 126.71, 127.29, 127.78, 128.05, 129.09, 134.17, 134.45, 137.41, 148.15, 150.37, 152.33, 171.74.

The light-induced configuration isomerization of the specific exemplary compounds 3a, 3b, 3c, 3d, 4a, and 4b was found to occur when irradiated with ultraviolet and visible light.

Example 2

The helical twisting power, HTP, of the compounds 3a-d and 4a,b was measured by dissolving a known quantity of material in a nematic liquid crystal host and measuring the induced helical pitch length, in this case, by observing the wavelength of visible light reflected from the Bragg reflective material. The nematic host was E7, a eutectic mixture of liquid crystal components commercially available from Merck. The chiral material to be investigated was dissolved in the nematic host in sufficient quantity to form a chiral nematic material that was Bragg reflective in the visible spectrum. The HTP was measured in a display cell fabricated from two glass substrates (2 in×2 in) each coated with a transparent conductor indium tin oxide (ITO), which was over-coated with a hard coat layer and a polyimide alignment layer. The two glass pieces are held together with a gasket material and spacers to maintain a cell thickness of 5 microns. The back surface of the cell, opposite the viewing side, is painted with a black spray paint. A small gap is left in the gasket material to fill the cell with the chiral nematic liquid crystal mixture performed in a vacuum chamber. The display cell was held in the dark for over 30 hours then the reflective wavelength measured with a spectrometer in an integrating sphere with a strobe white light source with a short strobe time. Values of HTP calculated from the measured wavelength, known chiral/host concentrations and the host refractive index. These values are shown in Table I below for both molar fraction and weight fraction concentrations.

TABLE I

The helical twisting power of chiral dopants in E7 nematic host in the initial (trans-trans) configuration
E7 Host

| Dopant | HTP (molar) $\mu m^{-1}$ | HTP (wt %) $\mu m^{-1}$ |
| --- | --- | --- |
| 3a | 153 | 60 |
| 3b | 158 | 57.5 |
| 3c | 172 | 58 |
| 3d | 166 | 53 |
| 4a | 171 | 57 |
| 4b | 116 | 55 |

Example 3

A fixed negative photo image was created on a display cell. The display cell was fabricated from of two glass substrates (2 in×2 in) each coated with a transparent conductor indium tin oxide (ITO), which was overcoated with a hard coat layer and a polyimide alignment layer. The two glass pieces are held together with a gasket material and spacers to maintain a cell thickness of 5 microns. A small gap is left in the gasket material to fill the cell with the photochiral liquid crystal mixture. The cell is filled in a vacuum chamber with cholesteric liquid crystal mixture consisting of 0.8% 3b (left-handed photo-chiral dopant), 15.87% E44 (nematic host, Merck), and 83.33% BLO61 (mixture of a nematic host with right-handed chiral dopant, Merck). Once filled, the cell is placed in a bladder press at 6 psi for 30 minutes to press the cell to a uniform thickness. After 30 minutes, the cell is sealed with Hardman's two-part epoxy. Once the epoxy is cured, the cell is back painted with black spray paint. The completed cell is placed in the darkness for the period of a day then placed in ambient light for viewing. The display cell appeared red with a Bragg reflective peak measured at 636 nm. After UV exposure for 10 seconds (637 µW/cm² at $\lambda_{max}$=365 nm) the pitch length of the cholesteric LC decreases resulting in a green reflective color with a Bragg peak at 554 nm. The pitch length change is due to the reduction of the twisting power of the photo-chiral dopant after photo-isomerization. Exposure through a mask leads to a two color image formed by regions with two different cholesteric pitch lengths, a red unexposed area and green exposed area.

Figure 12:
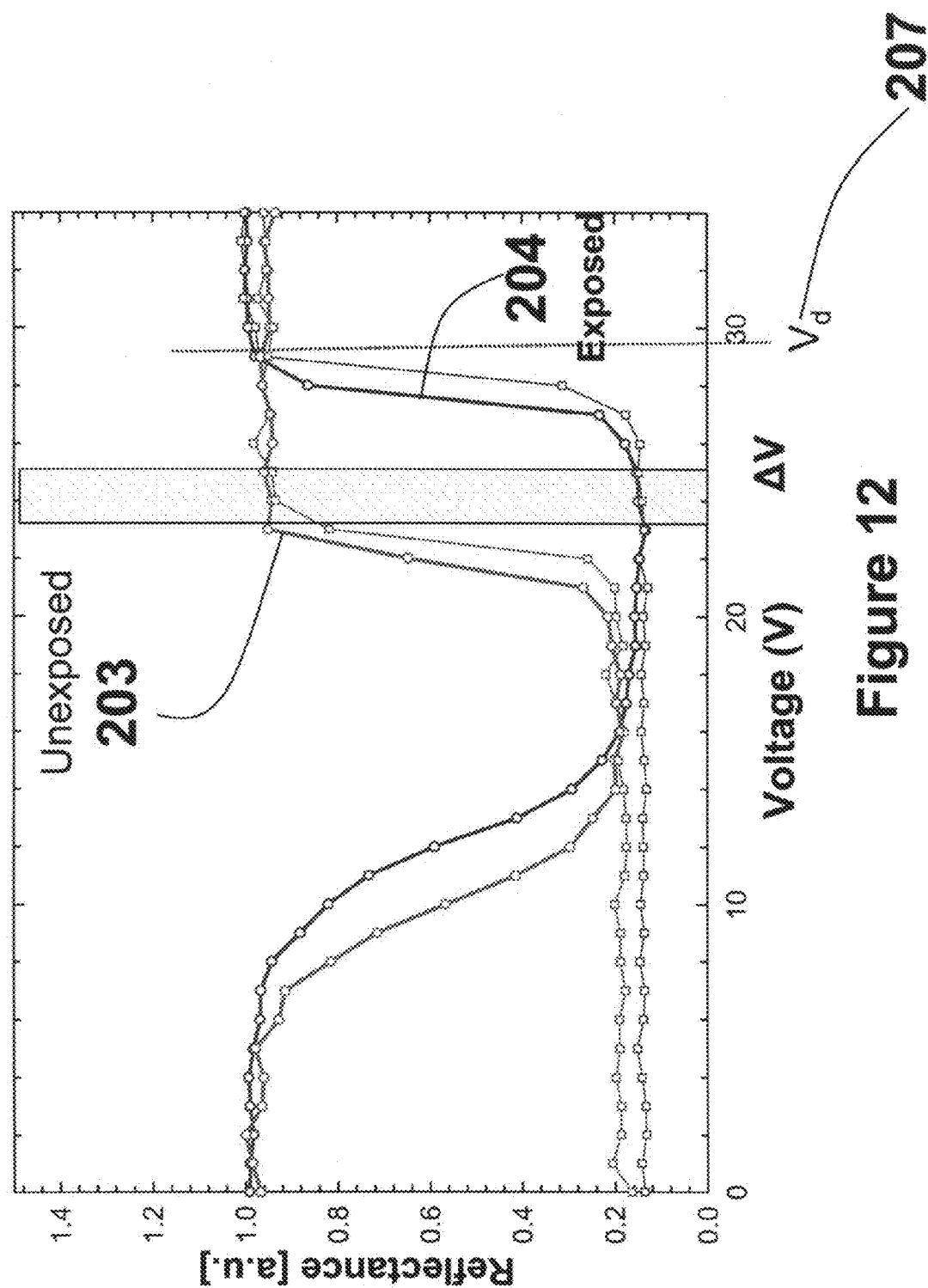
FIG. 12: Electrooptic response curves used in Example 3.

The electrooptic curves for the exposed and unexposed regions are shown in FIG. 12. Applying a voltage pulse in the range ΔV in FIG. 12 switches the exposed region of the display to the transparent focal conic state; the unexposed region to the planar state. The result is a black image (created by the black coating on the display) on a red reflective background. The image is fixed and not degraded. The image can be erased by switching at voltages above or below the ΔV after thermal relaxation of the exposed regions or by heating the display cell above the isotropic transition of the material.

Example 4

A fixed positive photo image was created on a cell. The display cell was fabricated as described in Example 3 except filled with a different cholesteric liquid crystal mixture. The mixture has 6.0% compound 3b, and 94% nematic host, (a commercial high birefringence, high dielectric anisotropy nematic mixture by Merck). Once filled, the cell is placed in a bladder press at 6 psi for 30 minutes to press the cell to a uniform thickness. After 30 minutes, the cell is sealed with Hardman's two-part epoxy. Once the epoxy is cured, the cell is back painted with black spray paint and placed in the darkness for several days. Upon removal from the darkness, the display cell appears green in ambient room light with a Bragg reflective peak at 530 nm. The display cell was masked with an image and the cell exposed through the mask to UV light (637 µW/cm² at $\lambda_{max}$=365 nm) for 10 s. Exposed regions change the reflected color to red, while unexposed regions stay green. Application of a voltage transfers the unexposed green regions to transmissive focal conic state, while exposed red regions remain red in the planar texture. A fixed positive image therefore is displayed on the photodisplay cell.

Example 5

Hiding a planar texture image was demonstrated using a display cell as described in Example 3. The display cell was masked with an image and the cell exposed through the mask to UV light (637 µW/cm² at $\lambda_{max}$=365 nm) for 10 s whereby a planar image in the planar texture appeared on the cell. This image could then be hidden by switching the entire display cell to the focal conic texture. This was done by applying a voltage multiple times while decreasing the voltage from 20 volts to 10 volts, until the entire display was in the focal-conic texture. The applied voltage was applied for 100 ms at a time at a frequency of 250 Hz. Once in the focal-conic texture, the image was not observable. The planar image could be made to reappear by applying a 100 ms pulse at 35 V at a frequency of 250 Hz to switch the entire cell to the planar texture.

Example 6

A photo image was created in the planar texture of a cholesteric liquid crystal coating deposited on the single plastic substrate. A layer of encapsulated cholesteric liquid crystal in polymer binder was coated from water-based emulsion on the thin plastic substrate using a doctor blade having a 37 micron gap and allowed to dry for 30 min at room temperature. The thickness of encapsulated liquid crystal layer was approximately 25 µm. The ratio between liquid crystal and binder was 6:1. The emulsion was prepared from 0.4 g of liquid crystal mixture consisting of 6.0% chiral molecule 3b and 94% nematic host, (a commercial high birefringence, high dielectric anisotropy nematic mixture by Merck) and 0.27 g of NeoRez R967. To improve the display contrast, a small amount. (0.4 wt %) of 4-hexylamino-4'-nitro-azobenzene dye was added to liquid crystal before emulsification. The mixture was emulsified with a homogenizer at 1000 rpm for 3-4 min at room temperature and coated by doctor blade with a gap of 25 μm. The average size of cholesteric liquid crystal droplets was about 18 m in diameter. The UV exposure of the encapsulated cholesteric coating through the mask for 10 minutes (637 μW/cm$^2$ at $\lambda_{max}$=365 nm) results in a planar image written on the photodisplay. Encapsulation of the liquid crystal impedes molecular self diffusion from degrading the image.

Example 7

A multiple color triple stack display with blue, red and green reflective photocells was fabricated to demonstrate the inventive concepts of addressing each cell in the stack optically with a different image to provide a color image capable of eight colors obtained by additive color mixing. The multiple color photochiral cholesteric liquid crystal display was created by stacking three glass display cells. Each of the display cells are fabricated from two glass substrates (2 in×2 in×0.039 in) each coated with indium tin oxide (ITO), hard coat, and polyimide. The two glass pieces of each cell are held together with a gasket material and spacers to maintain a cell thickness of 5 microns. A small gap is left in the gasket material to fill the cell with the photochiral liquid crystal mixture consisting of a pretwisted right-handed cholesteric mixture (EMD Chemicals) with a reflective wavelength of 454 nm to which was added the photochiral material 3c of Example 1. In the pretwisted right-handed cholesteric mixture the photochiral compound 3c was found to have a twisting power of 40.8 μm$^{-1}$ after being held in the dark for 30 hours whereas it was found to have a twisting power of approximately 3.9 μm$^{-1}$ after exposure to UV light ($_{max}$=365 nm) for 1 minute at an intensity of 5 mW/cm$^2$. It was further found that after exposure compound 3c would maintain the twisting power of 3.9 μm$^{-1}$ when the sample was held in ambient light for an indefinite period of time but would revert back to a twisting power of 40.8 μm$^{-1}$ after being returned to the dark for 30 hours. With these values of the twisting power, the relative concentrations of 3c and the pretwisted cholesteric mixture could then be calculated to obtain the desired reflective wavelengths as described earlier in Section I in the patent (see also *Fundamentals of Liquid Crystal Devices*, D-K Yang and S. T. Wu, Chapter 1 (John Wiley & Sons, New York 2006). For the top glass cell of the stacked display, the photochiral liquid crystal mixture consisted of 98.77% of a pretwisted right-handed cholesteric mixture (EMD Chemicals), with an initial reflective wavelength of 454 nm to which was added 1.23% of compound 3c (left-handed photo-chiral dopant). For the middle glass cell, the mixture consisted of 98.77% of the right handed cholesteric mixture but with an initial wavelength of 522 nm to which was added 1.23% of compound 3c. The mixture of the bottom display consisted 98.98% of the right handed cholesteric mixture but with an initial wavelength of 635 nm to which was added 1.02% of compound 3c. Prior to filling, the mixtures are heated to isotropic to ensure that all components are mixed and the mixtures are a homogeneous solution. Then, the mixtures are vacuum filled into the individual glass cells and the filling hole is sealed.

After the individual cells are made, the cells are stacked by applying Norland's optical adhesive 81 in between each cell, aligning the edges of the cells with one another, and placing the stacked display cell under UV light for 30 minutes at an intensity of 2 mW/cm$^2$ to cure the adhesive. Once the adhesive is cured, the cell is back painted with black spray paint.

The completed stacked cell is placed in an oven set to 100° C. to clear the liquid crystal to the isotropic. After 10 minutes, the cell is removed from the oven and placed in the dark for 30 minutes to cool to the focal conic texture. In the dark, each cell of the cooled stacked display is switched to the planar texture with a voltage of 50 volts at a pulsewidth of 100 ms at a frequency of 250 Hz. The top glass cell reflected green light with a Bragg reflective peak measured at 527 nm. The middle cell reflected red light with a peak wavelength at 621 nm. The bottom cell had a peak wavelength at 756 nm. As mentioned before, the photochiral, in the unexcited state, has a helical twisting power (in the same liquid crystal mixture) of approximately 40.8 μm$^{-1}$, resulting in a significant peak wavelength shift from the initial wavelength of the cholesteric liquid crystal.

Figure 17:
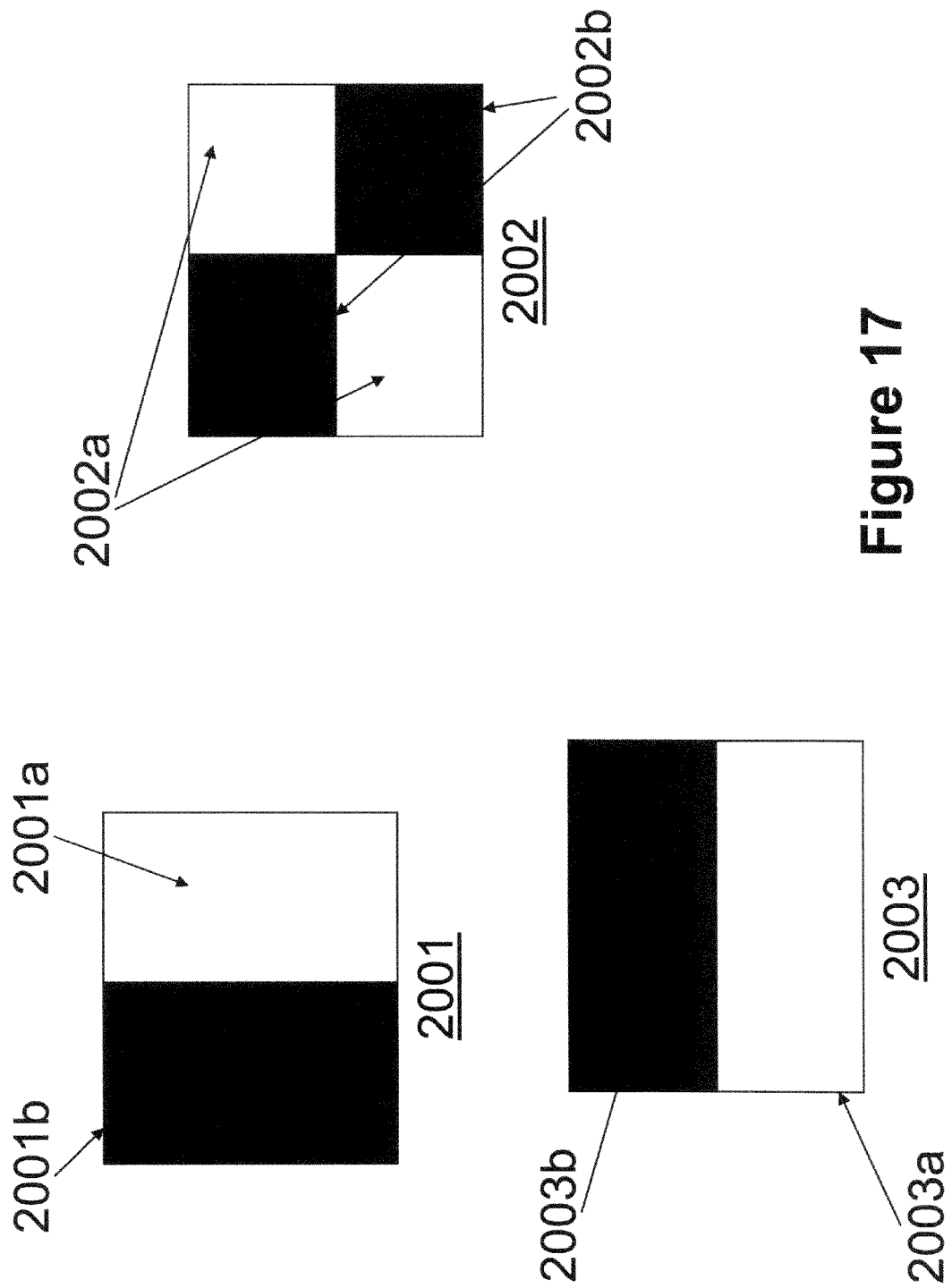
FIG. 17: Photo-masks for multiple color imaging used in Example 7.

Once fully switched to the planar texture, a negative mask of the image 2001 of FIG. 17 for the top cell is placed on top of the display. The cell is then irradiated with UV ($\lambda_{max}$=365 nm) for 1 minute at 5 mW/cm$^2$. Area 2001*a* of FIG. 17 is irradiated whereas area 2001*b* blocks irradiation from reaching the stacked cell. After UV exposure, the helical twisting power of the photochiral in the exposed regions is decreased due to photo-isomerization. The exposed regions of the top cell resulted in a blue reflective color with a Bragg peak at 460 nm, and the unexposed regions stayed green. The exposed areas of the middle cell and the bottom cell are shifted to green and red, respectively. To fix the blue image to the top cell, the top cell is switched with a 28V, 100 ms pulse at 250 Hz. The application of the 28V voltage transitioned the exposed blue regions to a transmissive focal conic state, while the unexposed green regions remained green in the planar texture.

The bottom two cells now have the same image as the top cell but only in the planar texture. The planar images are erased from these two cells by allowing the irradiated chiral materials to relax to their original wavelength. The relaxation process is speeded up by placing the stacked cell in an oven set to 50° C. At this temperature, the cell does not transition to the isotropic state, but simply heats the cell to quicken the relaxation process and erase the planar images from the cell. After 1 hour, the cell is removed from the oven and placed in the dark for 30 minutes to cool. In the dark, only the middle and the bottom cells are switched to the planar texture with a voltage of 50 volts at a pulse width of 100 ms at a frequency of 250 Hz. The top cell still has an image displayed. Next, a negative mask of the image 2002 of FIG. 17 for the middle cell is placed on top of the stacked display cell, and the display is exposed to UV just as before. Area 2002*a* of FIG. 17 is irradiated whereas area 2002*b* blocks irradiation from reaching the stacked cell. As mentioned before, the middle cell in the relaxed state reflects red light with a wavelength peak at 621 mm. When irradiated, the unexposed area remains red, and the exposed region shifts from red to green. After exposure, the middle cell is switched with a 23V, 100 ms pulse at 250 Hz, where the green exposed regions are switched to the focal conic texture and the red unexposed regions are switched to the planar. As before the planar images are erased from the cells by allowing the irradiated chiral materials to relax to their original wavelength by placing the stacked cell in an oven set to 50° C. for 1 hour.

The same process described for the top and middle layer is used to erase and write an image to the bottom display. Mask 2003 of FIG. 17, showing the irradiated 2003*a* and blocked 2003*b* areas respectively, was used to pattern the bottom displays. To switch the exposed regions to the focal conic, the voltage used for the bottom display was 18V.

Figure 18:
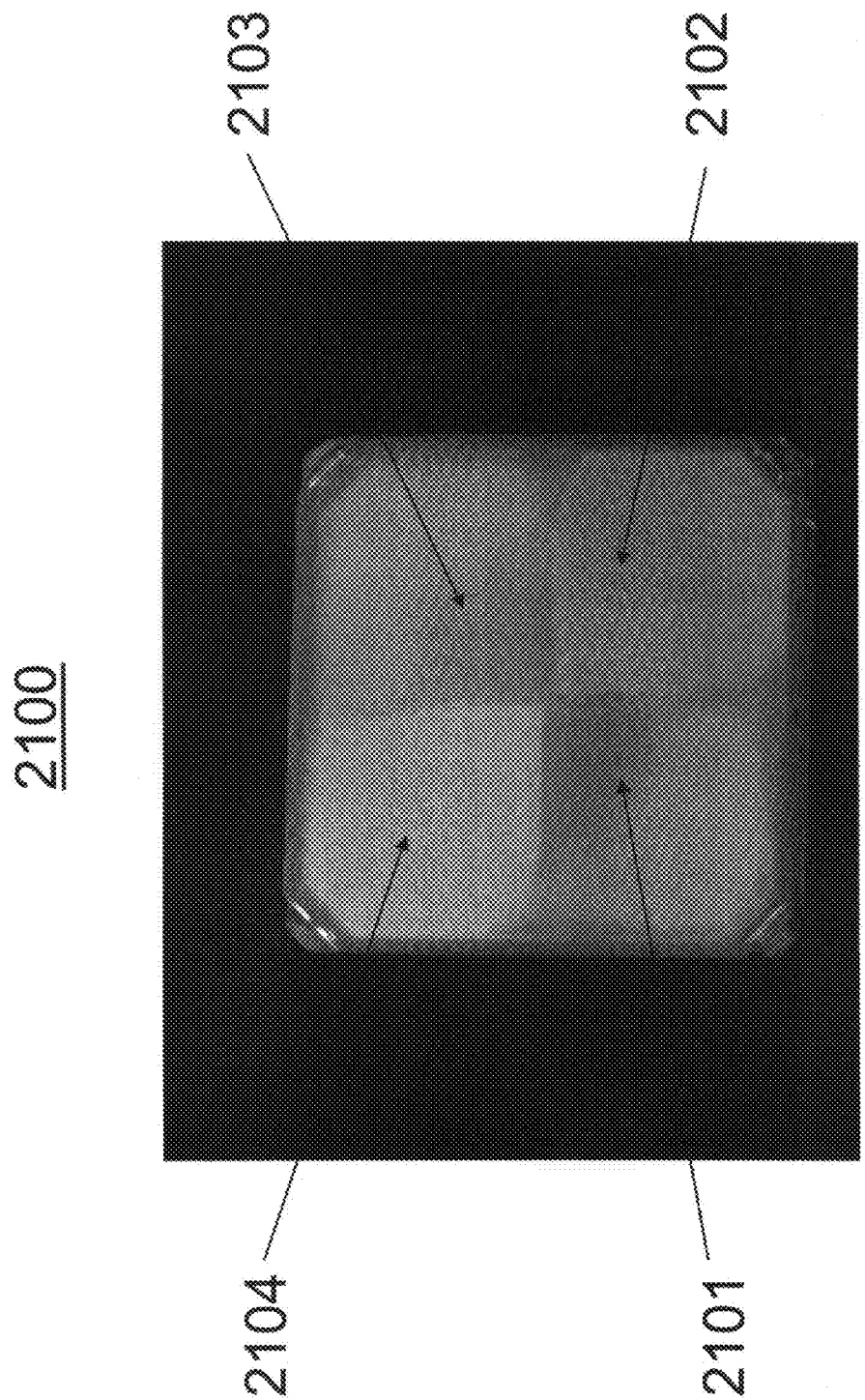
FIG. 18: Photograph of the addressed multiple color display of Example 7

Once the images are written on each cell, the cell is exposed one final time to UV (without a mask) to shift the wavelengths of the planar textures of the top, middle, and bottom cells to blue, green, and red, respectively, resulting in a full color photochiral display. Ambient light is sufficient to shift the wavelengths of each layer to their respective color. However, this final irradiation speeds up the process. Thereafter, ambient light maintains the full color image. This multiple color photodisplay does not require an optical filter for viewing in ambient light. FIG. 18 shows a photo of the imaged color photodisplay 2100 showing the blue 2101, green 2102, red 2103 imaged portions of the display and a white 2104 portion showing additive color mixing of blue, green and red.

Example 8

The colored image of the photodisplay of Example 7 was observed to remain on the cell over a period of four weeks without degradation. When placed in the dark for 24 hours the image would change color but it would return to its proper blue, green, red and white colors after being placed in ambient light or more quickly by irradiation by a UV lamp. The image was then erased by applying a voltage of 50 volts for 100 ms at 250 Hz to drive all the cells to the planar texture. A new multiple color image was optically addressed to the cell in an identical manner as described in Example 7.

Many modifications and variations of the invention will be apparent to those of ordinary skill in the art in light of the foregoing disclosure. Therefore, it is to be understood that, within the scope of the appended claims, the invention can be practiced otherwise than has been specifically shown and described.

What is claimed is:

1. A stacked photodisplay comprising:
   at least first and second liquid crystal layers of cholesteric liquid crystal material stacked in a fixed relation to each other including a first and a second photosensitive chiral additive, respectively;
   wherein said first liquid crystal layer comprises exposed regions that have been exposed to electromagnetic radiation including said first photosensitive chiral additive of a twisting power, and unexposed regions that have not been exposed to said electromagnetic radiation, said unexposed regions including said first photosensitive chiral additive of a different twisting power than in said exposed regions;
   wherein said second liquid crystal layer comprises exposed regions that have been exposed to electromagnetic radiation including said second photosensitive chiral additive of a twisting power, and unexposed regions that have not been exposed to said electromagnetic radiation, said unexposed regions including said second photosensitive chiral additive of a different twisting power than in said exposed regions;
   electrically conductive layers disposed on both sides of each of said first and second liquid crystal layers;
   a light absorbing layer positioned to absorb light passing through said first and second liquid crystal layers;
   wherein said first liquid crystal layer includes a first fixed image portion and said second liquid crystal layer includes a second fixed image portion that is different than said first fixed image portion, wherein each of said first fixed image portion and said second fixed image portion comprises one of said exposed regions and said unexposed regions in a planar texture and the other one of said exposed regions and said unexposed regions in a focal conic texture so as to resist degradation over time, wherein said first and second fixed image portions combine to form an image on said photodisplay.

2. The photodisplay of claim 1 comprising:
   a third liquid crystal layer of cholesteric liquid crystal material stacked in a fixed relation to said first and second liquid crystal layers, and including a third photosensitive chiral additive, wherein said third liquid crystal layer comprises exposed regions that have been exposed to electromagnetic radiation including said third photosensitive chiral additive of a twisting power, and unexposed regions that have not been exposed to said electromagnetic radiation, said unexposed regions including said third photosensitive chiral additive of a different twisting power than in said exposed regions;
   electrically conductive layers disposed on both sides of said third liquid crystal layer;
   said light absorbing layer absorbing light passing through said first, second and third liquid crystal layers;
   wherein said third liquid crystal layer includes a third fixed image portion that is different than said first and second fixed image portions, wherein said third fixed image portion comprises one of said exposed regions and said unexposed regions in said planar texture and the other one of said exposed regions and said unexposed regions in said focal conic texture so as to resist degradation over time, wherein said first, second and third fixed image portions combine to form an image on said photodisplay.

3. The photodisplay of claim 2 wherein said third photosensitive chiral additive is the same as said first and second photosensitive chiral additives.

4. The photodisplay of claim 2 wherein said cholesteric liquid crystal material of said first liquid crystal layer has a pitch length effective to reflect light of a first color in ambient light, said cholesteric liquid crystal material of said second liquid crystal layer has a pitch length effective to reflect light of a second color in ambient light and said cholesteric liquid crystal material of said third liquid crystal layer has a pitch length effective to reflect light of a third color in ambient light, wherein said first, second and third colors are different from each other.

5. The photodisplay of claim 4 wherein said first, second and third colors are red, green and blue in any order.

6. The photodisplay of claim 2 comprising at least one substrate over which said first, second and third liquid crystal layers are disposed in the fixed relation.

7. The photodisplay of claim 6 comprising a plurality of said substrates comprised of transparent polymer or transparent glass, including said substrates forming outer surfaces of said photodisplay and one or two of said substrates disposed between adjacent said liquid crystal layers.

8. The photodisplay of claim 1 wherein said cholesteric liquid crystal material of said first liquid crystal layer has a pitch length effective to reflect light of a first color in ambient light and said cholesteric liquid crystal material of said second liquid crystal layer has a pitch length effective to reflect light of a second color in ambient light that is different than said first color.

9. The photodisplay of claim 1 comprising at least one substrate over which said first and second liquid crystal layers are disposed in the fixed relation.

10. The photodisplay of claim 9 wherein said substrate is flexible and comprises a transparent polymer or transparent glass.

11. The photodisplay of claim 1 wherein each of said liquid crystal layers comprises a dispersion of the liquid crystal material in a polymer matrix.

12. An article comprising the photodisplay of claim 1, wherein said article is selected from the group consisting of: point of sales signs, debit cards, stored value cards, smart cards, credit cards, name plates, name tags, security badges, identification badges, informational signs, electronic shelf labels and combinations thereof.

13. The photodisplay of claim 1 comprising drive electronics that apply a voltage pulse to said conductive layers at a magnitude such that said liquid crystal material of said one of said exposed regions and said unexposed regions is in said planar texture while said liquid crystal material of said other one of said exposed regions and said unexposed regions is in said focal conic texture producing said first and second fixed images.

14. The photodisplay of claim 13 wherein said drive electronics erase said first and second fixed images by applying a voltage pulse to said conductive layers that places both said exposed regions and said unexposed regions into the same texture.

15. The photodisplay of claim 1 wherein said first photosensitive chiral additive is the same as said second photosensitive chiral additive.

16. The photodisplay of claim 1 comprising at least one transparent upper substrate, one of said conductive layers being disposed between said substrate and one of said first and second liquid crystal layers.

17. The photodisplay of claim 1 wherein said liquid crystal material of said first and second liquid crystal layers comprises at least one chiral compound that is not photosensitive.

18. The photodisplay of claim 1 wherein said first and second photosensitive chiral additives are each in different isomer forms when having said twisting power and said different twisting power, due to said exposure to said electromagnetic radiation.

19. The photodisplay of claim 18 wherein said first and second photosensitive chiral additives are each returned to a stable said isomer form upon application of visible light or heat.

20. An apparatus for writing on a photodisplay, the photodisplay including two or three layers of cholesteric liquid crystal material stacked relative to each other each including a photosensitive chiral additive, electrically conductive layers flanking each of said liquid crystal layers and a light absorbing layer positioned to absorb light passing through said liquid crystal layers, said apparatus comprising:
    a controller adapted to provide electronic image data signals corresponding to image data and to provide electronic light source signals;
    an electronic display device including a plurality of pixels adapted to form images when said pixels are in ON or OFF states;
    a display driver adapted to supply voltage pulses to said display device in response to said image data signals from said controller effective to independently place said pixels of said display device in said ON or OFF states;
    a light source adapted to be energized or de-energized in response to said light source signals from said controller effective to project ultraviolet light through said display device onto said photodisplay;
    wherein when said light source is energized to produce ultraviolet light and said display driver applies said voltage pulses forming the image on said display device the ultraviolet light passing through the image of said display device addresses said photodisplay with an image portion formed of optically addressed regions at a first twisting power and optically unaddressed regions at a second twisting power; and
    a pulse driver adapted to apply fixing voltage pulses to said electrically conductive layers flanking a selected one of said liquid crystal layers effective to form a fixed image portion by placing one of said optically addressed or optically unaddressed regions of said selected layer in a focal conic texture that is stable in an absence of an electric field and the other of said optically addressed or optically unaddressed regions of said selected layer in a planar texture, said pulse driver being further adapted to apply erasing pulses that erase each said fixed image portion from said photodisplay.

21. The apparatus of claim 20 wherein said display device is a backlit liquid crystal display.

22. The apparatus of claim 20 including a computer for processing said electronic image data used by said controller.

23. The apparatus of claim 20 wherein said light source can be energized to apply visible light to said photodisplay effective to erase all images from said photodisplay except for said fixed image portion.

24. The apparatus of claim 20 wherein all images from said photodisplay erase over a period of time except for said fixed image portion.

25. A method of optically writing on a stacked color photodisplay comprising
    a) providing a photodisplay including two or three layers of cholesteric liquid crystal material stacked on each other, said liquid crystal layers each comprising nematic liquid crystal and a photosensitive chiral additive that is adapted to be reversibly changed between a first twisting power and a second twisting power, said liquid crystal material of said liquid crystal layers having a pitch length effective to reflect light of different predetermined colors in ambient light, electrically conductive layers disposed on both sides of each of said liquid crystal layers, and a light absorbing layer that absorbs light passing through said liquid crystal layers;
    b) projecting electromagnetic radiation to address said photodisplay with an image portion formed of optically addressed regions where said photosensitive additives are at said first twisting power and optically unaddressed regions where said photosensitive additives are at said second twisting power, said first twisting power being different from said second twisting power;
    c) applying fixing voltage pulses to said electrically conductive layers disposed on both sides of a selected one of said liquid crystal layers effective to form a fixed image portion that resists degradation over time by placing one of said optically addressed or optically unaddressed regions of said selected layer in a focal conic texture that is stable in an absence of an electric field and the other of said optically addressed or optically unaddressed regions of said selected layer in a planar texture;
    d) erasing all images from said photodisplay except for said fixed image portions; and
    e) repeating steps c) and d) until said photodisplay reflects a fixed image comprising an additive mixture of two or three different said fixed image portions each being at said predetermined colors.

26. The method of claim 25 comprising applying erasing voltage pulses to the conductive layers effective to place all of said liquid crystal layers in an all planar texture.

27. The method of claim 25 wherein said fixing voltage pulses place the optically addressed regions of said selected liquid crystal layer in said focal conic texture and said optically unaddressed regions of said selected liquid crystal layer in said planar texture producing a negative said fixed image portion.

28. The method of claim 25 wherein said fixing voltage pulses place the optically unaddressed regions of said selected liquid crystal layer in said focal conic texture and said optically addressed regions of said liquid crystal layer in said planar texture producing a positive said fixed image portion.

29. The method of claim 25 wherein step d) is carried out by applying visible light to said photodisplay without a mask.

30. The method of claim 29 wherein said application of said visible light further returns each said fixed image portion to said predetermined color.

31. The method of claim 25 wherein step d) is carried out by applying heat to said photodisplay without a mask.

32. The method of claim 31 wherein said application of said heat further returns each said fixed image portion to said predetermined color.

33. The method of claim 25 wherein said electromagnetic radiation is projected as a digital image from a liquid crystal display.

34. The method of claim 25 carried out on said photodisplay as a component of an article selected from the group consisting of: point of sales signs, debit cards, stored value cards, smart cards, credit cards, name plates, name tags, security badges, identification badges, informational signs, electronic shelf labels and combinations thereof.

35. The method of claim 25 comprising three of said liquid crystal layers, wherein said predetermined colors are blue, green and red in any order.

36. The method of claim 25 wherein said photosensitive chiral additives are reversed between said first twisting power and said second twisting power using as said electromagnetic radiation visible or ultraviolet light.

37. The method of claim 25 wherein said photosensitive chiral additives are reversed between said first twisting power and said second twisting power using as said electromagnetic radiation ultraviolet light or electromagnetic radiation without ultraviolet light.

38. The method of claim 25 wherein said photosensitive chiral additives are reversed between said first twisting power and said second twisting power using heat.

\* \* \* \* \*